(12) United States Patent
Nam et al.

(10) Patent No.: US 8,681,174 B2
(45) Date of Patent: Mar. 25, 2014

(54) HIGH DENSITY MULTI-VIEW IMAGE DISPLAY SYSTEM AND METHOD WITH ACTIVE SUB-PIXEL RENDERING

(75) Inventors: Dong Kyung Nam, Yongin-si (KR); Du-Sik Park, Suwon-si (KR); Gee Young Sung, Daegu-si (KR); Chang Yeong Kim, Seoul (KR); Yun-Tae Kim, Hwaseong-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 667 days.

(21) Appl. No.: 12/926,260

(22) Filed: Nov. 4, 2010

(65) Prior Publication Data
US 2011/0102423 A1 May 5, 2011

(30) Foreign Application Priority Data

Nov. 4, 2009 (KR) .................. 10-2009-0105855

(51) Int. Cl.
| | | |
|---|---|---|
| G06T 15/00 | (2011.01) | |
| G09G 5/02 | (2006.01) | |
| G09G 5/00 | (2006.01) | |
| H04N 13/04 | (2006.01) | |
| H04N 9/12 | (2006.01) | |
| G06K 9/00 | (2006.01) | |
| G02F 1/1335 | (2006.01) | |
| G03B 21/00 | (2006.01) | |
| G01C 3/14 | (2006.01) | |
| G02B 27/22 | (2006.01) | |
| G06F 17/00 | (2006.01) | |
| G06K 7/00 | (2006.01) | |

(52) U.S. Cl.
USPC ........... 345/613; 345/419; 345/581; 345/589; 345/600; 345/690; 348/51; 348/739; 382/154; 382/165; 382/312; 349/15; 353/7; 356/12; 359/462; 463/32

(58) Field of Classification Search
USPC ......... 345/418–419, 428, 581, 589, 591, 593, 345/597–598, 600, 618–619, 664, 501, 530, 345/204, 690, 694, 6–8; 348/41–42, 49, 51, 348/54, 552, 577–578, 580, 739, 742; 382/154, 162, 165, 167, 274, 276, 285, 382/312; 349/15; 353/6–7; 356/3.14, 9, 12; 359/13, 242, 462, 466, 470, 471; 463/30–32, 33
See application file for complete search history.

(56) References Cited

U.S. PATENT DOCUMENTS

| | | | | |
|---|---|---|---|---|
| 5,841,439 A | * | 11/1998 | Pose et al. ...................... | 345/418 |
| 5,986,804 A | | 11/1999 | Mashitani et al. | |
| 7,190,518 B1 | * | 3/2007 | Kleinberger et al. ......... | 359/465 |

(Continued)

FOREIGN PATENT DOCUMENTS

| | | |
|---|---|---|
| DE | 102004059729 B3 | 4/2006 |
| WO | 2005/060270 A1 | 6/2005 |

(Continued)

OTHER PUBLICATIONS

Extended European Search Report issued May 13, 2013 in corresponding European Application No. 10189821.1.

*Primary Examiner* — Wesner Sajous
(74) *Attorney, Agent, or Firm* — Staas & Halsey LLP

(57) ABSTRACT

Provided are a high density multi-view image display system and method based on active sub-pixel rendering. The image display system may perform a rendering with respect to a viewpoint image in a pixel unit, using a viewpoint varying based on a position of left/right eyes of a user.

38 Claims, 15 Drawing Sheets

(56) References Cited

U.S. PATENT DOCUMENTS

| | | | |
|---|---|---|---|
| 7,957,581 B2* | 6/2011 | Wu | 382/154 |
| 2005/0117186 A1* | 6/2005 | Li et al. | 359/15 |
| 2005/0134600 A1* | 6/2005 | Credelle et al. | 345/589 |
| 2005/0259323 A1* | 11/2005 | Fukushima et al. | 359/462 |
| 2006/0232665 A1* | 10/2006 | Schowengerdt et al. | 348/51 |
| 2007/0058034 A1 | 3/2007 | Numazaki et al. | |
| 2007/0291035 A1* | 12/2007 | Vesely et al. | 345/427 |
| 2009/0102915 A1 | 4/2009 | Arsenich | |
| 2009/0215533 A1* | 8/2009 | Zalewski et al. | 463/32 |
| 2009/0278936 A1* | 11/2009 | Pastoor et al. | 348/169 |
| 2010/0149073 A1* | 6/2010 | Chaum et al. | 345/8 |

FOREIGN PATENT DOCUMENTS

| | | |
|---|---|---|
| WO | 2009/101558 A1 | 8/2009 |
| WO | 2009/130542 A1 | 10/2009 |

* cited by examiner

FIG. 4
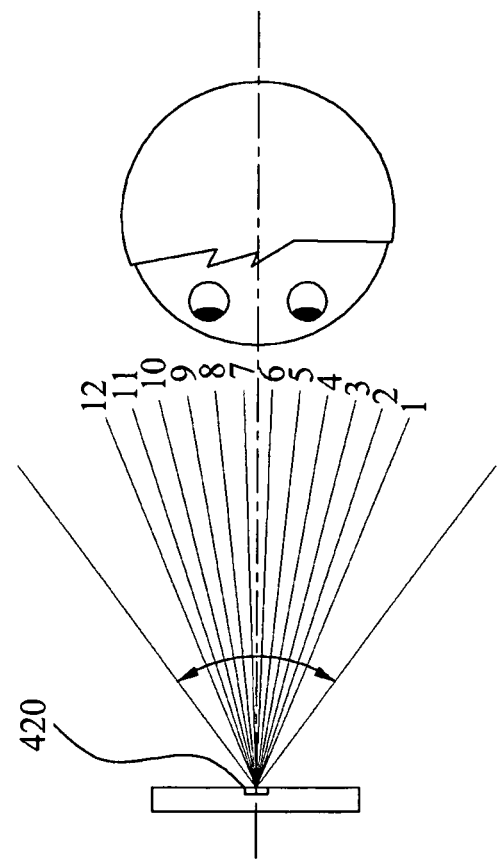
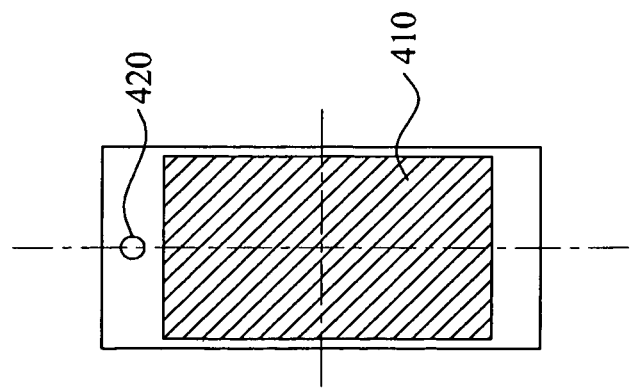

FIG. 7
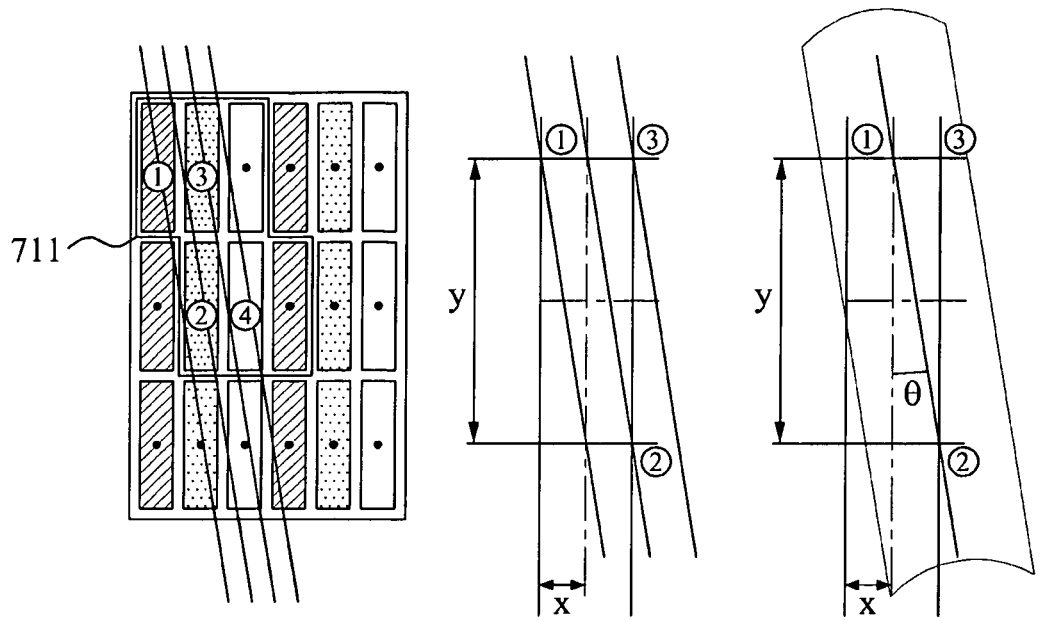
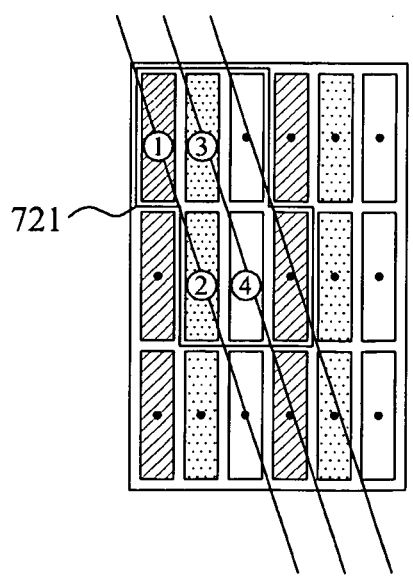
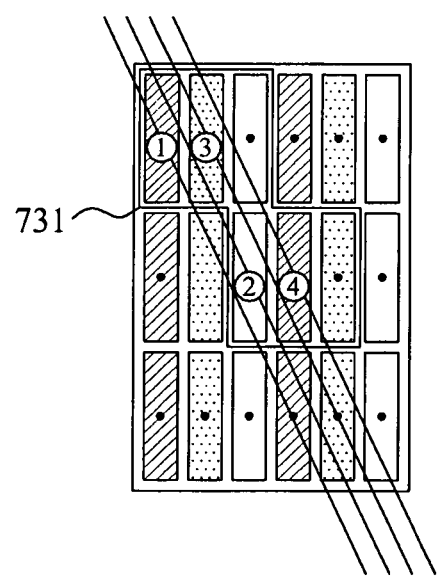

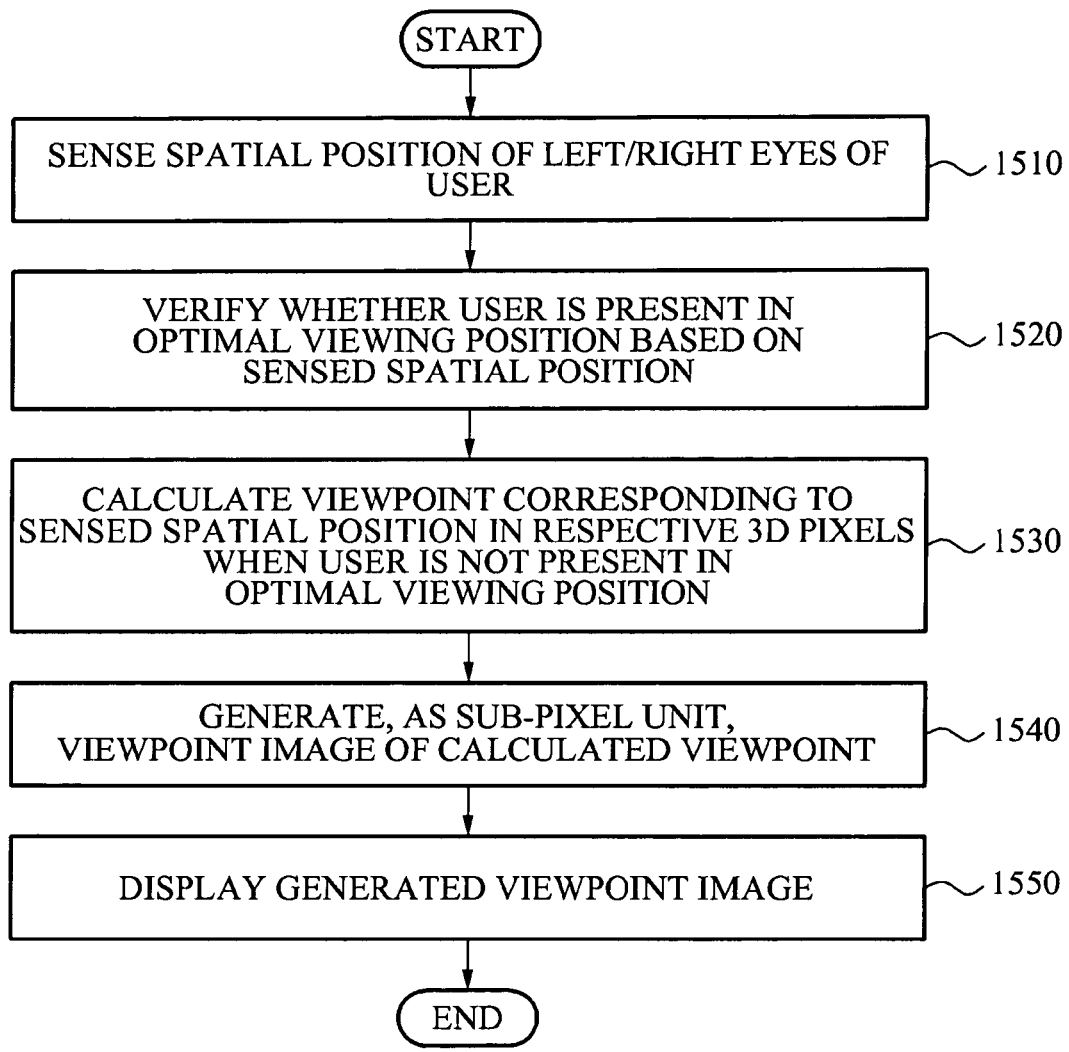

HIGH DENSITY MULTI-VIEW IMAGE DISPLAY SYSTEM AND METHOD WITH ACTIVE SUB-PIXEL RENDERING

CROSS-REFERENCE TO RELATED APPLICATIONS

This application claims the benefit of Korean Patent Application No. 10-2009-0105855, filed on Nov. 4, 2009, in the Korean Intellectual Property Office, the disclosure of which is incorporated herein by reference.

BACKGROUND

1. Field

One or more embodiments relate to a high density multi-view image display system and method with active sub-pixel rendering.

2. Description of the Related Art

To effectively implement a three-dimensional (3D) image, images having viewpoints different from each other may typically need to be respectively viewed by left/right eyes of users. To implement this 3D image without using a filter, e.g., without needing a user to wear filtering glasses to view the 3D image, the 3D image may need to be spatially divided based on the viewpoints, which are referred to as an autostereoscopic display. The viewpoints may represent viewing directions of generated light, from which particular views of the 3D image can be seen, and thus images provided along different viewpoints may be different from each other when viewing the images collectively. Here, for example, a left eye may view a different image from a right eye, as the light projected to each respective eye is from different images projected/viewed along different viewpoints. The collective viewing of the two different images for the same object thereby generates the 3D effect.

Thus, in an autostereoscopic display, a 3D image may be spatially divided using optical mechanisms, and displayed. Here, as an optical mechanism, optical lenses or an optical barrier may be representatively used. As an optical lens, a lenticular lens may be used by which respective pixel images are displayed/viewed only in/from a specific direction. In addition, using the optical barrier, only a specific pixel may be viewed from a specific direction due to a physical slit disposed in a front surface of a display. In a case of the autostereoscopic display using lenses or barriers, separate left and right viewpoint images, that is, two viewpoint images may be basically displayed in different directions, resulting in creation of a sweet spot where the two images converge in space, e.g., at respective left and right eyes. The sweet spot may have a narrow width, and may be expressed using a viewing distance and a viewing angle. Here, the viewing distance may be determined by a pitch of lenses or slits of the barrier, and the viewing angle may be based on a number of expressible viewpoints. In this instance, a scheme of increasing the number of display viewpoints to widen the viewing angle may be referred to as an autostereoscopic multi-view display.

A more widened 3D viewing area may be created using the multi-view display, however, this approach may result in the reduction in resolution of the display. For example, when displaying an image with nine-viewpoints using a panel having a 1920×1080 pixel resolution capable of displaying a full high definition (HD) image, the resolution for respective viewpoint images may actually only be 640×360 due to a reduction in resolution of the expressed image along the select viewpoint by ⅓ in length and width, respectively. This reduction in the resolution of the multi-view display may significantly reduce a 3D image quality, which may distort a 3D effect, causing viewing fatigue. To implement a high quality autostereoscopic display, a 3D image display having fewer limitations in the viewing area and less viewing fatigue may be significantly important, and thus an image having a greater number of viewpoints while maintaining a high-resolution may need to be displayed. However, this may be not easy to realize because the autostereoscopic display, where the two viewpoints are displayed, and the multi-view display have the above described conflicting characteristics.

In addition, the multi-view display may provide a wider viewing angle than that of the autostereoscopic display where the two viewpoints are displayed, however, this may result in the 3D image being viewed without distortion only within a limited viewing angle and at a specific distance. The multi-view display may also not allow the 3D image to be satisfactorily viewed when a user views the display while angling his face or lying at an angle. These viewing limitations may be a significant weak point in comparison with an existing 2D display and thus, as a 3D display, the multi-view display may encounter difficulty in commercialization.

SUMMARY

According to an aspect of one or more embodiments, there may be provided an image display system, the system including a position sensing unit to sense a position of user or one or more eyes of the user, a viewpoint calculating unit to calculate a viewpoint corresponding to the sensed position, a rendering unit to set a sub-pixel, of a three-dimensional (3D) pixel having plural sub-pixels to have color information from a viewpoint image of the sub-pixel, with a viewpoint of the sub-pixel and the viewpoint image of the sub-pixel being determined to be corresponding to the calculated viewpoint, and to set at least one other sub-pixel of the 3D pixel having a different viewpoint from the viewpoint of the sub-pixel to have additional color information of the viewpoint image of the sub-pixel, and a display unit to display the color information by the sub-pixel and the additional color information by the at least one other sub-pixel.

In this instance, the rendering unit may convert a color component value of the at least one other sub-pixel into a color component value corresponding to the viewpoint image of the sub-pixel, so that a color component of the color information of the viewpoint image of the sub-pixel is different from a color component of the additional color information of the viewpoint image of the sub-pixel.

Also, the display unit may display a three-dimensional (3D) pixel being configured such that an optical axis through a first sub-pixel of the 3D pixel and a first sub-pixel of another 3D pixel, for a same viewpoint, is inclined at an angle obtained based on a ratio of a size of N pixels in a vertical direction of the 3D pixel to a size of M sub-pixels in a horizontal direction of the 3D pixel, where N and M are integers being mutually prime to each other.

Also, the viewpoint calculating unit may calculate a direction angle corresponding to the sensed position from at least one 3D pixel, and compare differences between each of direction angles of all viewpoint images available to the at least one 3D pixel and the calculated direction angle to thereby determine, as the calculated viewpoint, a viewpoint of a viewpoint image having a minimal difference.

The system may further include a viewing position verifying unit to determine whether the user is present in an optimal viewing position for three-dimensional (3D) image display based on the sensed position.

According to another aspect of one or more embodiments, there may be provided an image display method including sensing a position of a user or one or more eyes of the user, calculating a viewpoint corresponding to the sensed position, rendering color information for sub-pixels of a three-dimensional (3D) pixel, including setting a sub-pixel of the 3D pixel to have color information from a viewpoint image of the sub-pixel, with a viewpoint of the sub-pixel and the viewpoint image of the sub-pixel being determined to be corresponding to the calculated viewpoint, and setting at least one other sub-pixel of the 3D pixel having a different viewpoint from the viewpoint of the sub-pixel to have additional color information of the viewpoint image of the sub-pixel, and displaying the color information by the sub-pixel and the additional color information by the at least one other sub-pixel.

According to another aspect of one or more embodiments, there may be provided a 3D display system, the system including a viewpoint calculating unit to calculate a left viewpoint based on a determined variable orientation of the user relative to a display and to calculate a right viewpoint based on the determined orientation of the user relative to the display, and a rendering unit to generate a left viewpoint image based on the left viewpoint, a right viewpoint image based on the right viewpoint, and at least one additional left viewpoint image from one or more sub-pixels from a viewpoint different from the left viewpoint and/or at least one additional right viewpoint image from sub-pixels from a viewpoint different from the right viewpoint though active sub-pixel rendering, wherein a simultaneous display of the generated left viewpoint image, the generated right viewpoint image, and at least one of the generated additional right and left viewpoint images provides the user with a 3D image for a three-dimensional (3D) pixel including plural sub-pixels.

According to another aspect of one or more embodiments, there may be provided a 3D display method, the method including calculating a left viewpoint based on a determined variable orientation of the user relative to a display and calculating a right viewpoint based on the determined orientation of the user relative to the display, and generating a left viewpoint image based on the left viewpoint, a right viewpoint image based on the right viewpoint, and at least one additional left viewpoint image from one or more sub-pixels from a viewpoint different from the left viewpoint and/or at least one additional right viewpoint image from sub-pixels from a viewpoint different from the right viewpoint though active sub-pixel rendering, wherein a simultaneous displaying of the generated left viewpoint image, the generated right viewpoint image, and at least one of the generated additional right and left viewpoint images provides the user with a 3D image for a three-dimensional (3D) pixel including plural sub-pixels.

According to another aspect of one or more embodiments, there may be provided an image display system, the system including a position sensing unit to sense a position of a user or one or more eyes of the user, a viewpoint calculating unit to calculate a viewpoint for at least one three-dimensional (3D) pixel with respect to the sensed position, and a rendering unit to render a 3D image by performing active sub-pixel rendering based upon the calculated viewpoint, with the active sub-pixel rendering including rendering color information for a first sub-pixel of the 3D pixel having a viewpoint, of plural viewpoints of the 3D pixel, closest to the calculated viewpoint to have color information of a viewpoint image defined for the first sub-pixel and rendering color information for at least one sub-pixel, of the 3D pixel, adjacent to the first sub-pixel to have color information of the viewpoint image for the first sub-pixel, with the at least one sub-pixel adjacent to the first sub-pixel having a viewpoint different from the viewpoint of the first sub-pixel.

According to another aspect of one or more embodiments, there may be provided an image display method, the method including sensing a position of a user or one or more eyes of the user, calculating a viewpoint for at least one three-dimensional (3D) pixel with respect to the sensed position, and rendering a 3D image by performing active sub-pixel rendering based upon the calculated viewpoint, with the active sub-pixel rendering including rendering color information for a first sub-pixel of the 3D pixel having a viewpoint, of plural viewpoints of the 3D pixel, closest to the calculated viewpoint to have color information of a viewpoint image defined for the first sub-pixel and rendering color information for at least one sub-pixel adjacent to the first sub-pixel to have color information of the viewpoint image for the first sub-pixel, with the at least one sub-pixel, of the 3D pixel, adjacent to the first sub-pixel having a viewpoint different from the viewpoint of the first sub-pixel.

Additional and/or alternative aspects, features, and/or advantages will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which:

FIG. 4 illustrates a determining of a viewing viewpoint using a user tracking scheme, according to one or more embodiments;

FIG. 7 illustrates a pixel structure and condition for active sub-pixel rendering, according to one or more embodiments;

FIG. 15 is a flowchart illustrating an image display method, according to one or more embodiments.

DETAILED DESCRIPTION

Figure 1:
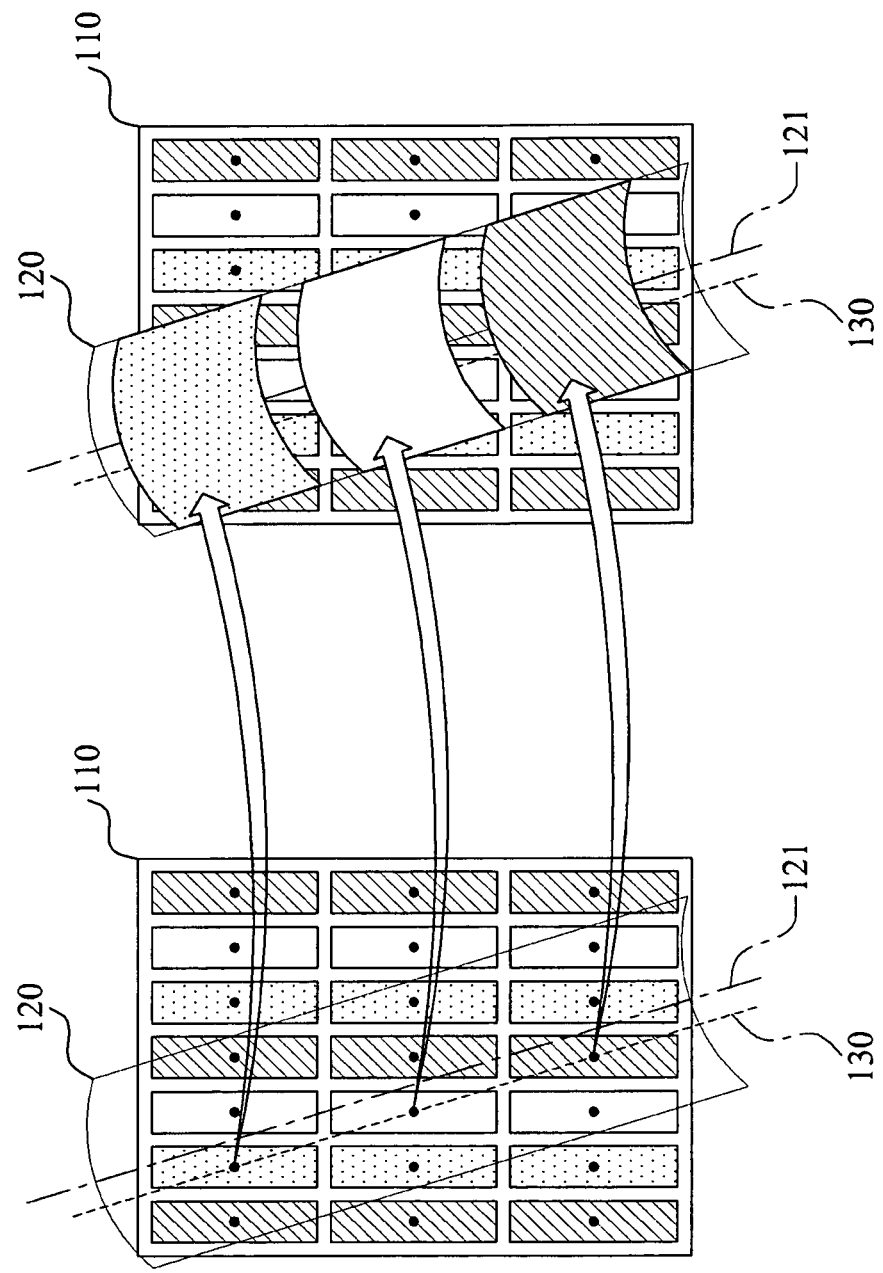
FIG. 1 illustrates a displaying of a directional viewpoint image based on lenses, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Embodiments may relate to an image display system and method that may track a position of left/right eyes of a user to determine viewpoint information for an image viewed by the user, and in one or more embodiments provide a three-dimensional (3D) image without or with limited crosstalk or distortion of a 3D effect, using active sub-pixel rendering based on the determined viewpoint information. By performing sub-pixel rendering instead of only pixel-rendering, the number of displayed viewpoints may be increased based on the number of sub-pixels, e.g., with the number of displayable/viewable viewpoints being equal to the number of sub-pixels in a 3D pixel in one or more embodiments, and an optimal image may be rendered using the viewpoint information to be displayed, whereby a deterioration in a 3D image quality occurring in the sub-pixel rendering may not occur.

Sub-pixel Rendering.

As only an example, to display a 3D image without the aforementioned filtering glasses, images having different viewpoints based on a viewing position may be displayed and separately viewable when viewing a 3D image. For example, separate images may be displayed to left and right eyes of a user, respectively, thereby providing a 3D effect. To implement this, light emitted from each pixel of a display may be observable primarily only from a specific direction, which may be a significant difference in comparison with a 2D display where each pixel information is displayed and observed to/from all directions. To enable the light emitted from each pixel to be observable only from the specific direction, lenses or a barrier may be generally used, for example.

FIG. 1 illustrates a displaying of a directional viewpoint image based on lenses, such as the aforementioned lenticular lens, according to one or more embodiments.

As illustrated in FIG. 1, lenticular lens 120 may be disposed on an upper/outer layer of a display 110. In such an embodiment, the display may have plural pixels, each with sub-pixels, such as the shown hatched red (R) sub-pixels, dotted green (G) sub-pixels, and non-marked blue (B) sub-pixels illustrated within display 110. When a focus of the lenticular lens 120 is positioned on/over particular pixels or sub-pixels, pixel or sub-pixel values displayed along a lens axis 121 may be enlarged through the lenticular lens when viewed from a particular viewpoint corresponding to the particular pixels/sub-pixels and the position of the viewer. The different axes of the particular lenticular lens 120 direct light in different directions, i.e., if the lenticular lens has 12 axes then 12 different viewing directions may be available. Thus, when a direction (viewing direction) from which the lenticular lens 120 is viewed is changed, the lens axis 121 may appear to have been move, to thereby represent a different viewpoint from different pixels or sub-pixels, e.g., for a different image, that may be enlarged. For example, when a direction viewed by a user is illustrated as a dotted line 130, sub-pixels where the dotted line 130 passes through may be enlarged through the lenticular lens. In this manner, as viewing direction of the user is changed, other pixel information may be displayed, so that other viewpoint images varying based on the direction viewed by the user may be displayed. For further explanatory purposes, first segment 510 of FIG. 5 demonstrates how different viewing directions can be generated by different axes of a lenticular lens, as shown by the indicated degree of change, e.g., from −10° to +10° from a central axis of the lenticular lens. For example, around the illustrated viewpoint ① the corresponding axis of the lenticular lens produces a positive 10° change in viewing direction.

To display the viewpoint image as a pixel, a pixel unit or a sub-pixel unit may be employed. As noted, the sub-pixel unit may be a minimal image display unit having a single piece of color information (for example, a unit to indicate each of red (R), green (G), and blue (B) in an RGB color space), and the pixel unit may be a minimal image display unit to express complete color information, e.g., with information for all color components, for a pixel obtained by joining sub-pixels together (for example, R, G, and B sub-pixels being collectively considered together to be the single pixel). This approach of FIG. 1 is defined as pixel-rendering.

Figure 2:
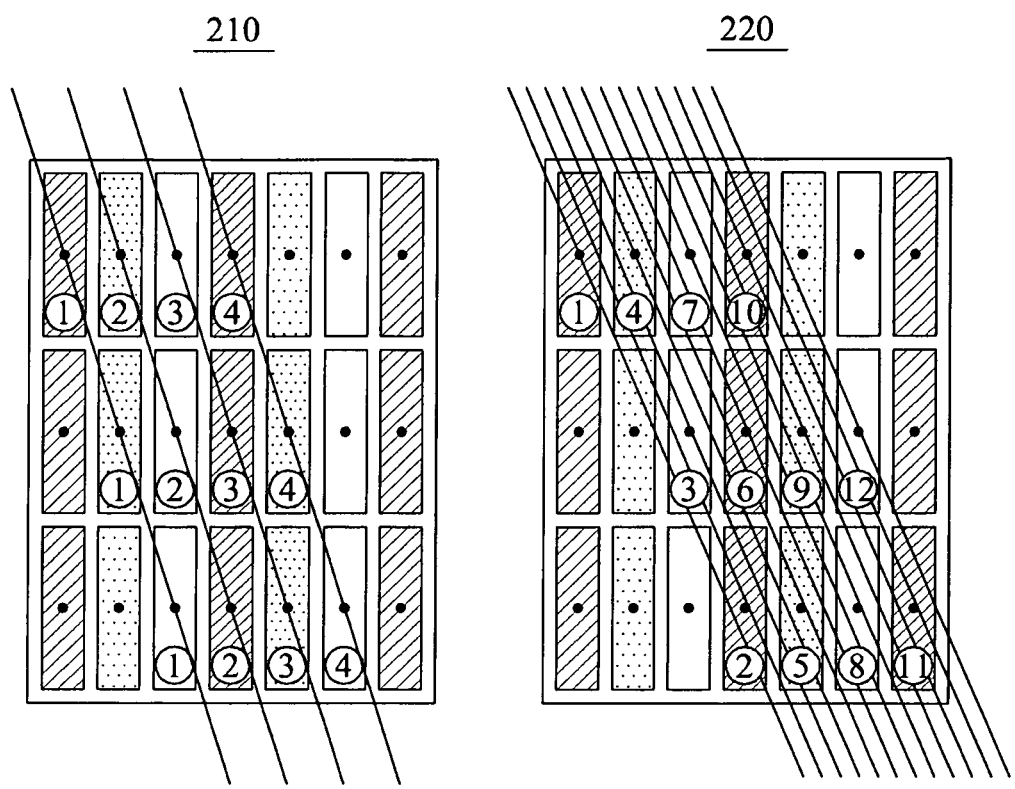
FIG. 2 illustrates a pixel structure for each of pixel-rendering and sub-pixel rendering, according to one or more embodiments.

FIG. 2 illustrates a pixel structure for each of pixel-rendering and sub-pixel rendering, according to one or more embodiments. Each of solid lines in segments 210 and 220 of FIG. 2 may indicate a respective lens axis of all lens axes of a lenticular lens. Segment 210 illustrates the case where all plural sub-pixels where a single lens axis passes over represent a single viewpoint image. For example, for segment 210, select plural sub-pixels ① below a first axis of the lenticular lens are selectively directed in a first viewpoint direction, select plural sub-pixels ② below another axis of the lenticular lens are selectively directed in a second viewpoint direction, select plural sub-pixels ③ below still another axis of the lenticular lens are selectively directed in a third viewpoint direction, and select plural sub-pixels ④ below the last illustrated axis of the lenticular lens are selectively directed in a fourth viewpoint direction. Again, this will be referred to as pixel rendering. As shown in segment 210, the respective axes of the particular lenticular lens each pass through/over all three R, G, and B sub-pixels, e.g., producing each of the different corresponding viewpoint images, based on the respective lens axis, with complete color information for all color components.

Segment 220 illustrates the case where a single lens axis of the lenticular lens passes through/over a single sub-pixel resulting in different viewpoint images for each sub-pixel of the 3D pixel, which may be referred to as sub-pixel rendering. As only an example, each lens axis of the plural axes of the lenticular lens passes over/through a respective select sub-pixel, such that each different viewpoint based on each respective lens axis represents a single color component defined by that select sub-pixel. As shown in FIG. 2, there may be 12 different viewpoints, i.e., a select sub-pixel may be individually viewed based upon the direction from which a user views the lenticular lens.

As noted, in pixel-rendering, complete color information, such as all R, G, and B color information from each respective sub-pixels along the same lens axis, may be collectively expressed with respect to the single lens axis, thereby expressing a viewpoint image without color distortion with all three color components.

Differently, in a case of a sub-pixel rendering, only a single color component may be desirably expressed with respect to any single lens axis, which may result in color distortion. However, as noted, when using such a sub-pixel rendering, an increased number of viewpoint images may be expressed in comparison with the pixel-rendering, which may be an advantage in a multi-view display expressing the increased number of viewpoint images. Thus, the pixel rendering and sub-pixel rendering both have respective advantages and disadvantages.

Figure 3:
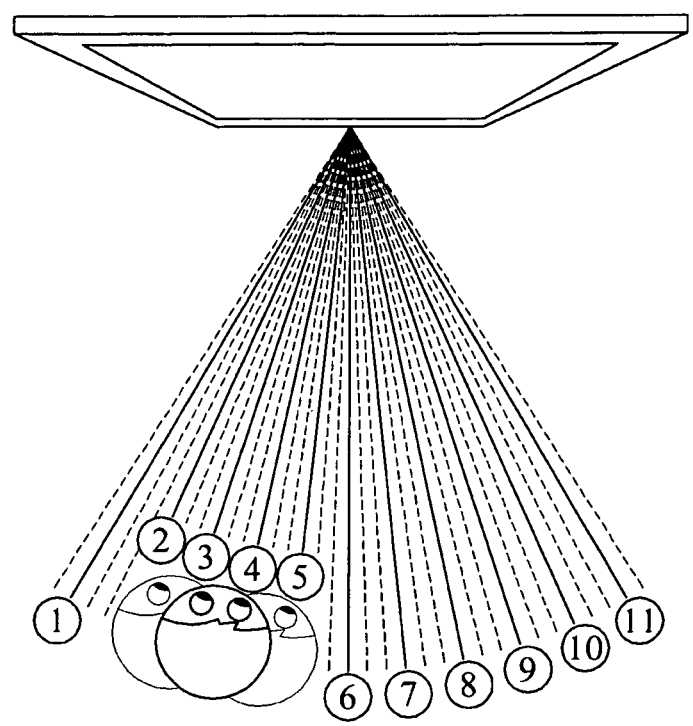
FIG. 3 illustrates a viewpoint generated by each of pixel-rendering and sub-pixel rendering, according to one or more embodiments.

FIG. 3 illustrates a viewpoint generated by each of pixel-rendering and sub-pixel rendering, according to one or more embodiments. That is, in a case of the multi-view display, when the multi-view display is viewed by a user between viewpoint images, two viewpoint images may be simultaneously respectively viewed by user's eyes. In this instance, in the case of the pixel-rendering, as a number of expressed viewpoint images is reduced, the interval or spacing between viewpoints may increase to cause the greater difference between the viewpoint images, and thus crosstalk between the viewpoints may be significantly generated.

Referring to FIG. 3, solid lines may indicate viewpoints generated by the pixel-rendering, e.g., the shown viewpoints ②-⑤ may represent the available viewpoints with pixel-rendering. However, with sub-pixel rendering, as the number of viewpoints is greater, e.g., with the availability of viewpoints between viewpoints ②-⑤, the number of expressible viewpoint images correspondingly increases, such that the interval or spacing between viewpoints may be reduced, and thus any crosstalk generated may be insignificant. Referring to FIG. 3, the dotted lines may indicate viewpoints generated by the sub-pixel rendering. In this instance, the viewpoints generated by the pixel-rendering in FIG. 3 may also be similarly generated by the sub-pixel rendering, with the sub-pixel rendering providing additional viewpoints.

That is, in a case of pixel-rendering, a high-quality viewpoint image may be expressed from an accurate viewpoint, e.g., with each viewpoint image having all three color components, however, the disparity between viewpoints may be relatively great, resulting in generation of significant crosstalk. In the sub-pixel rendering, with the increased number of viewpoints, any observable crosstalk between viewpoints may thus be insignificant, however, color ghosting may occur in each viewpoint image. In this manner, the quality of an image viewed from locations different from the expected viewpoints may have adverse influences on a 3D effect of a 3D display and result in eye fatigue. For example, when a right eye is outside of a viewpoint even though a left eye is properly positioned in a corresponding viewpoint, the crosstalk may significantly occur only in one eye, and thereby eye fatigue may increase.

Sub-pixel rendering using user's left and right eyes.

According to one or more embodiments, to implement a 3D image without or with reduced occurrence of crosstalk or color ghosts between viewpoints while generating an increased number of viewpoint images, a user's left and right eyes may be tracked to express a most appropriate viewpoint image to the user. In this case, the pixel-rendering may be used in images viewed by limited fixed positions of the user, however, the sub-pixel rendering may be used in viewpoint images varying based on the position of the user.

FIG. 4 illustrates a determining of a viewpoint using a user tracking scheme, according to one or more embodiments. In FIG. 4, a viewpoint image corresponding to an image currently viewed by a user may be ascertained by photographing the user, for example, the photographing being performed by using a camera 420 integrated with a display 410 displaying a multi-view image. As only an example, the display 410 could thus potentially display twelve different viewpoint images.

Figure 5:
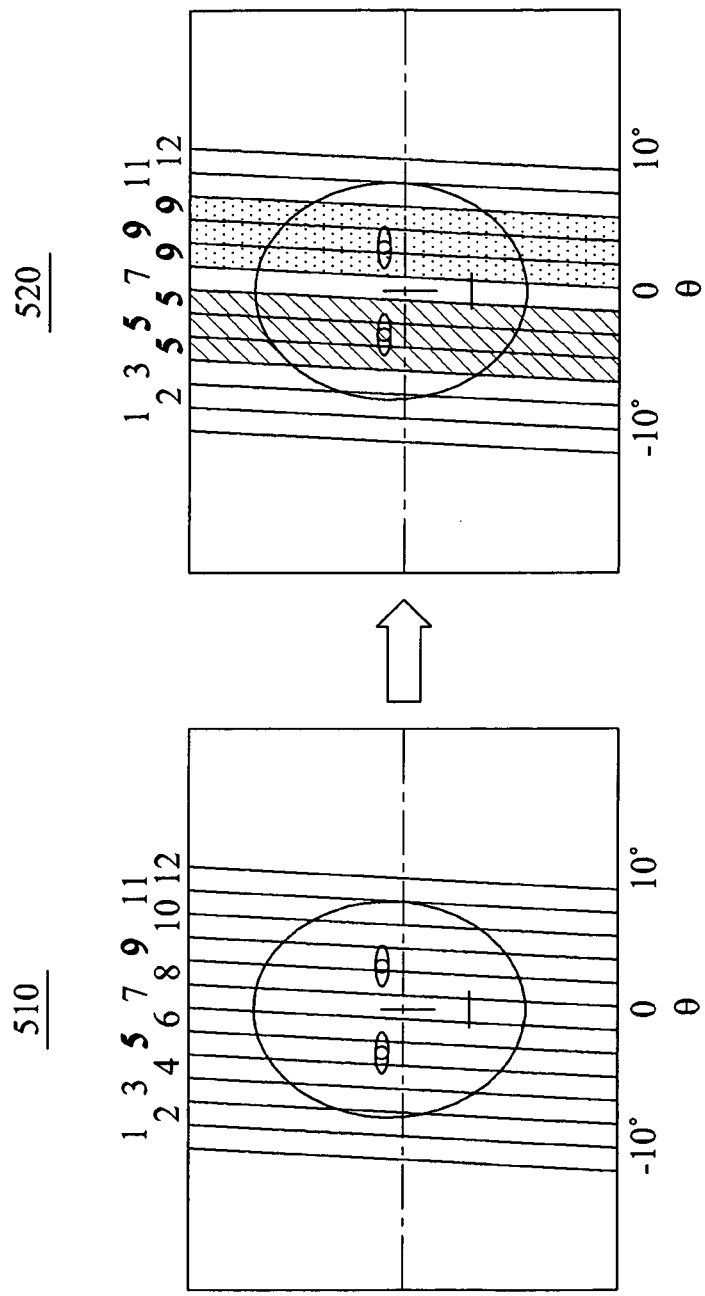
FIG. 5 illustrates an active sub-pixel rendering based on a viewing viewpoint, according to one or more embodiments.

FIG. 5 illustrates an active sub-pixel rendering based on a viewing viewpoint, according to one or more embodiments. As illustrated in FIG. 5, respective viewpoint images may be viewable in one of 12 select directions or viewpoints, for a single 3D pixel on a display. As noted above, FIG. 5 illustrates how each viewpoint corresponds to light being expressed in a different direction, with the different directions ranging between ±10° depending on lens axes for the corresponding lenticular lens, for example. In this instance, when a user is positioned at a particular sweet spot, that is, an optimal viewing position, respective viewpoint images from all 3D pixels may be observed from the same point. In this case, the respective viewpoint images for each of the 12 directions may be obtained by the sub-pixel rendering, e.g., with each viewpoint image being made up of a single color. In this case, a rendering operation to render a pixel is illustrated in FIG. 5. That is, as illustrated in a first segment 510, as for a position of a user's left and right eyes, e.g., as determined by a photograph of the user using a camera, it may be determined that a right eye is primarily positioned along a viewpoint 5 and a left eye is positioned primarily along a viewpoint 9, i.e., for this particular 3D pixel and corresponding lenticular lens, the desired emission/viewing directions are according to viewpoint 5 for the right eye and viewpoint 9 for the left eye.

In this instance, to remove the aforementioned example color ghost occurring due to the sub-pixel rendering, viewpoint images (e.g., viewpoint images 4 and 6 for the right eye) adjacent to the viewpoint 5 may be converted into additional viewpoint images 5. That is, when it is assumed that each sub-pixel has respective information of one of R, G, and B colors, for different viewpoint images, and the original viewpoint image 5 may be a viewpoint image on which sub-pixel rendering is performed to have only R color information for that viewpoint image, the viewpoint images 4 and 6 may be converted into the additional viewpoint images 5 to have G and B color information, respectively, for the viewpoint image 5, rather than their respective color information for their viewpoint images 4 and 6. Thus, according to an embodiment, the additional viewpoint images 5 would still direct light in their respective different directions along viewpoints 4 and 6, for example, but would be providing color information for an image corresponding to viewpoint 5 rather than the respective color information for images provided to either viewpoints 4 or 6. Thus, similarly, for the left eye, viewpoint images 8 and 10 may be rendered into additional viewpoint images 9 having different color information, respectively, from the original viewpoint image 9. As shown in segment 520 of FIG. 5, with this active sub-pixel rendering, the adjacent viewpoint images have been converted into viewpoint images corresponding to a user's eyes and thereby, an image on which the sub-pixel rendering is performed may actually appear to be have been rendered through the more accurate pixel-rendering scheme, from the user's viewpoint. Throughout the present specification, such a sub-pixel rendering scheme including such a conversion of viewpoint image information for adjacent viewpoints to a same viewpoint image, e.g., based upon a determined viewing direction of the user, will be referred to as active sub-pixel rendering.

In this instance, when the user moves, the right eye may move to a position corresponding to a viewpoint 4 and the left eye may move to position corresponding to a viewpoint 8. As an example, here, the viewpoint 4 may express G color information of an original viewpoint image 4, and sub-pixels corresponding adjacent viewpoints 3 and 5 may be converted into, or controlled to display, B and R color information of the viewpoint 4, respectively, rather than color information for viewpoints 3 and 5. Conversion of color information may be applicable in a viewpoint 8 in the same manner as described above. In this manner, as for images where the user's left and right eyes are properly positioned at a particular viewpoint, the number of viewpoints that may be generated with regard to each 3D pixel, e.g., based on a change in the user's position, is twelve and may be obtained using the sub-pixel rendering.

Figure 6:
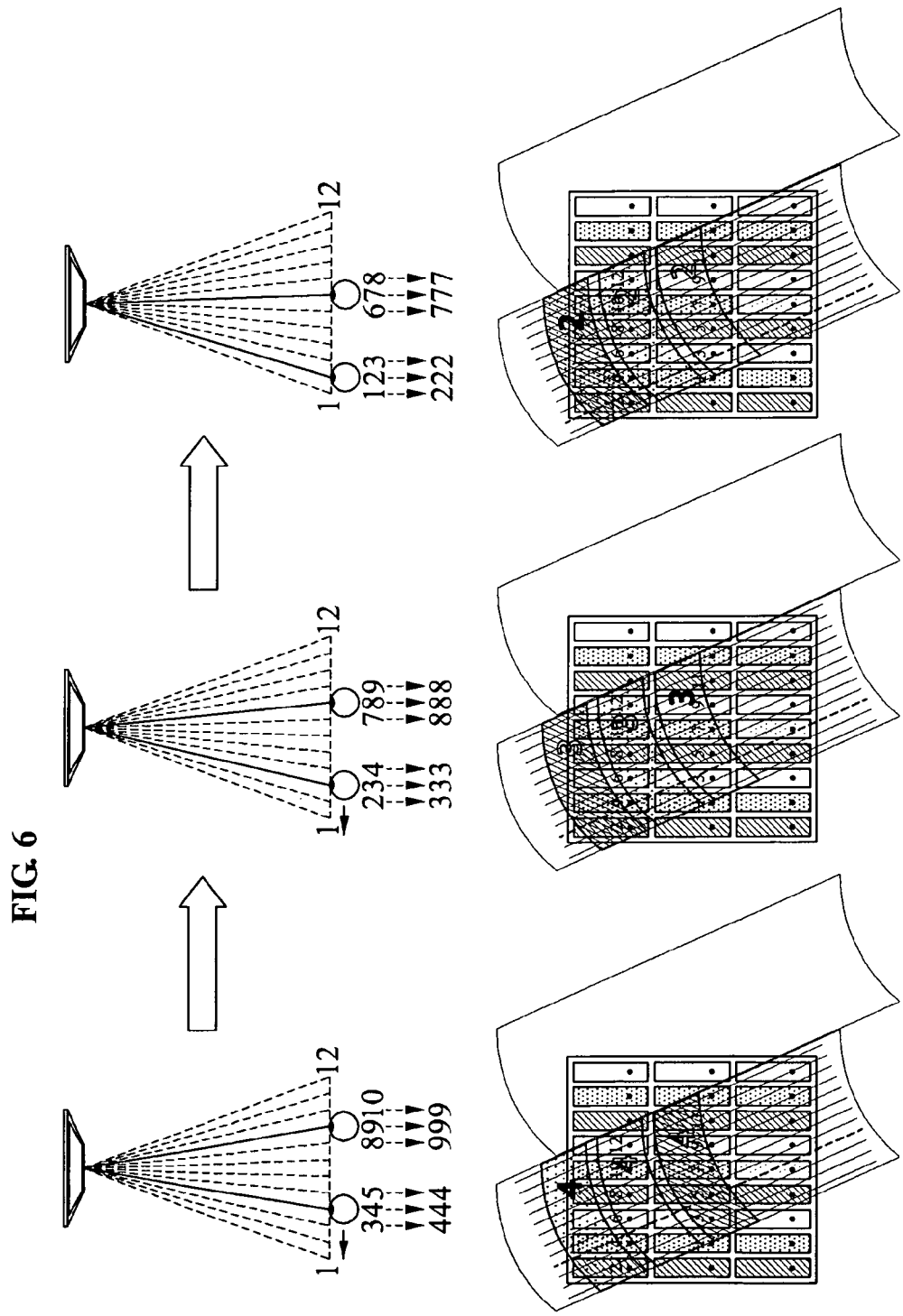
FIG. 6 illustrates an active sub-pixel rendering based on movement of a viewing viewpoint, according to one or more embodiments.

FIG. 6 illustrates an active sub-pixel rendering based on a determined movement of a viewing viewpoint, according to one or more embodiments. FIG. 6 illustrates a change in an image value expressed on a lens based on when a user's left eye moves to positions corresponding to viewpoints 4, 3, and 2, respectively, and when a user's right eye moves to positions corresponding to viewpoints 9, 8, and 7, respectively. Here, FIG. 6 illustrates the active sub-pixel rendering for viewpoints 4, 3, and 2 and viewpoints 9, 8, and 7 in combination with illustrations of the corresponding axes for the corresponding lenticular lens based on the respective left eye viewpoints 4, 3, and 2, i.e., with each respectively illustrated dashed line representing the corresponding lens axis of the lenticular lens.

To display a 3D image using the above described active sub-pixel rendering scheme, an appropriate pixel structure and lens alignment may be required, and positions of user's left and right eyes may need to be determined and a corresponding sub-pixel rendering may need to be performed. With reference to FIGS. 1 and 2, as only an example, a method of displaying a multi-view 3D image using the lens has been described, however in one or more embodiments, for a high quality active sub-pixel rendering, a pixel structure and lens alignment may need to satisfy the following conditions (1) to (3):

(1) A distance between lens axes passing through/over a 3D pixel with respect to each viewpoint may need to be the same. That is, a direction of a viewpoint image made by each sub-pixel within the 3D pixel may need to be formed at predetermined intervals, to thereby form a high quality multi-view image. To form the high quality multi-view image, the lenticular lens and corresponding lens axis may need to be inclined at an angle obtained based on a ratio of a size of N pixels in a vertical direction to a size of M sub-pixels in a horizontal direction, in a single 3D pixel. In this instance, N and M are integers, the pixel and sub-pixel may indicate a pixel and sub-pixel of a display panel. Alternatively, for example, a display unit to display a plurality of viewpoint images may need to display a 3D pixel being made up such that an optical axis is inclined at an angle obtained based on a ratio of a size of N pixels in a vertical direction to a size of M sub-pixels in a horizontal direction.

FIG. 7 illustrates a pixel structure and condition for active sub-pixel rendering, according to one or more embodiments. Referring to a first segment 710 of FIG. 7, as an example of describing the above condition (1), a vertical size of a 3D pixel 711 may be indicated as 'y', and may have a value being twice a value of a vertical pixel distance of a display panel. Also, a horizontal size of the 3D pixel 711 may be indicated as 'x', and when the horizontal size of the 3D pixel 711 has a value being equal to a horizontal pixel distance of the display panel, uniform viewpoint images may be generated. Also, as an example of a pixel structure satisfying the above condition (1), a lens axis of a lenticular lens may need to have an inclination angle 'θ' with respect to a vertical direction, and 'θ' may be determined by the below Equation 1, for example.

$$\theta = \tan^{-1}(x/y) = \tan^{-1}(M/N)$$ Equation 1

(2) For the active sub-pixel rendering, each sub-pixel forming a 3D pixel may need to form a separate viewpoint image. To form the separate viewpoint image, M and N may need to be integers being mutually prime to each other. For example, contrary to such a desire, as illustrated in a segment 720 of FIG. 7, when a size of a 3D pixel 721 satisfies N=2 and M=2, a lens axis forming a single viewpoint image may pass through the centers of two sub-pixels, and thus, though pixel-rendering may be available, sub-pixel rendering may be impossible for some arrangements.

(3) For the active sub-pixel rendering, color information displayed by adjacent viewpoint images may need to be different from each other. For example, when colors of adjacent viewpoint images 1, 2, and 3 are expressed as R, G, and G, the active sub-pixel rendering is performed with respect to the viewpoint image 2, failing to obtain B color. To obtain color information displayed by adjacent viewpoint images the colors for the respective color information may need to be different from each other. Here, with three colors, M may also need to be a multiple of 3, for example.

In a segment 730 of FIG. 7, a pixel structure satisfying all of the above described conditions (1) to (3) is illustrated. In this instance, a size of a 3D pixel 731 may satisfy N=2 and M=3, that is, satisfy all of the above described conditions (1) to (3). In this case, in an embodiment, a maximum number of viewpoint images enabled to be generated by the active sub-pixel rendering may be six.

As for implementing the active sub-pixel rendering through tracking of the user's left and right eyes, a case where the user is positioned in the optimal viewing position has been described with reference to FIG. 4. An active sub-pixel rendering scheme when the user is not positioned in the optimal viewing position, or when the user is in a tilted posture will now be herein described in greater detail.

When the user is positioned in the optimal viewing position, identical viewpoint images generated by respective 3D pixels may be gathered in a single spot, and thus the sub-pixel rendering may be performed based on a viewpoint image with respect to only a single 3D pixel as illustrated in FIG. 4. However, when the user is not positioned in the optimal viewing position or when the user is in a tilted posture, the sub-pixel rendering may need to be performed separately based on each of the viewpoint images from the respective 3D pixels.

Figure 8:
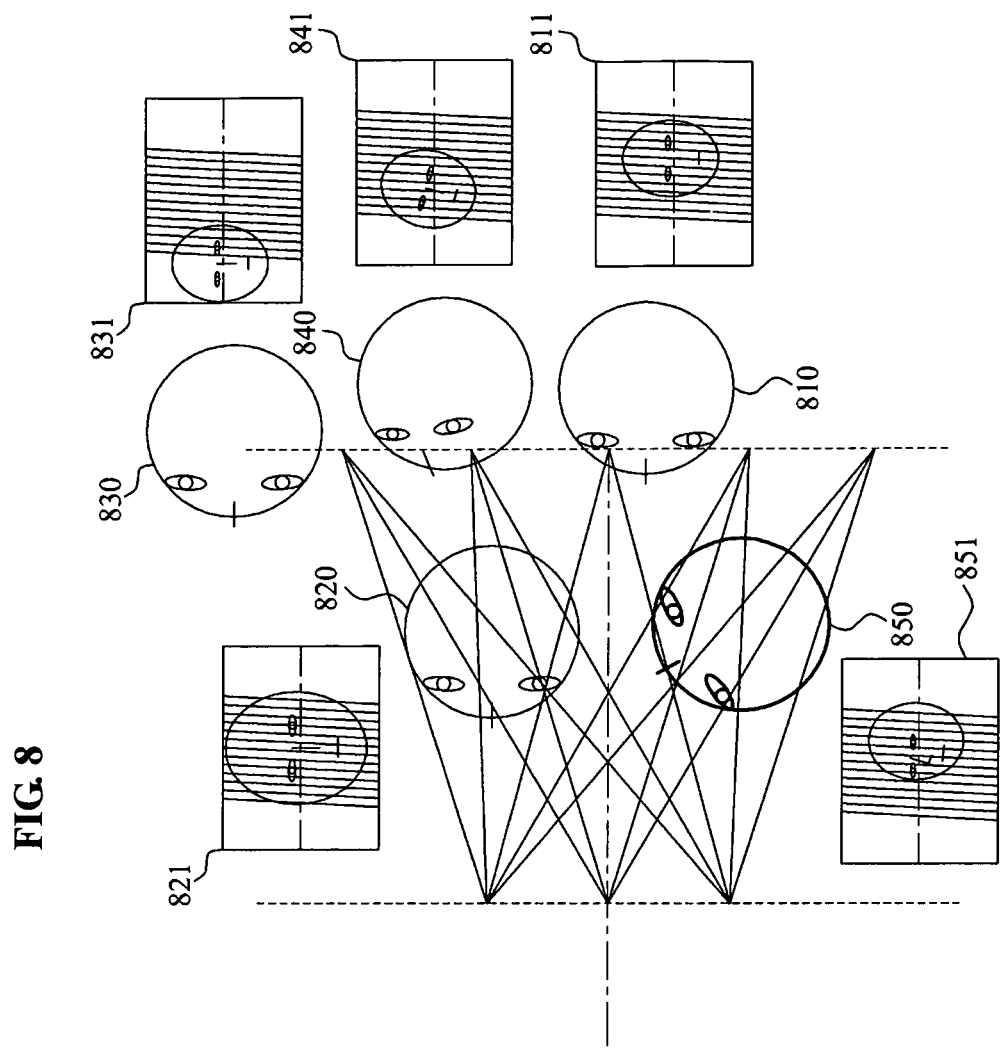
FIG. 8 illustrates a state where a position and a posture of a user are changed, according to one or more embodiments.

FIG. 8 illustrates a state where a position and a posture of a user are changed, according to one or more embodiments. A first position 810 may be a general position such as the aforementioned optimal viewing position, and may designate a case where user's eyes are perpendicular to a display surface in a direction of an identical axis to that of a display. In this instance, the illustrated first segment 811 may be an image obtained by photographing the user in the first position 810, and a position corresponding to each viewpoint. A second position 820 may designate a case where the user is located outside of an optimal viewing distance, a third position 830 may designate a case where the user is located outside of an optimal viewing angle, a fourth position 840 may designate a case where a head of the user is tilted in the optimal viewing position, and a fifth position 850 may designate a case where the user views a display with a side glance while located outside of the optimal viewing distance. The illustrated second to fifth segments 821, 831, 841, and 851 may designate images obtained by photographing the user in respective positions or respective viewpoints, with respective illustrated overlays of the different lens axes. In this instance, according to one or more embodiments, the sub-pixel rendering may be performed separately with respect to all viewpoint images from the respective 3D pixels based on a position of the user's left and right eyes, thereby providing a high quality 3D image having a high resolution.

Figure 9:
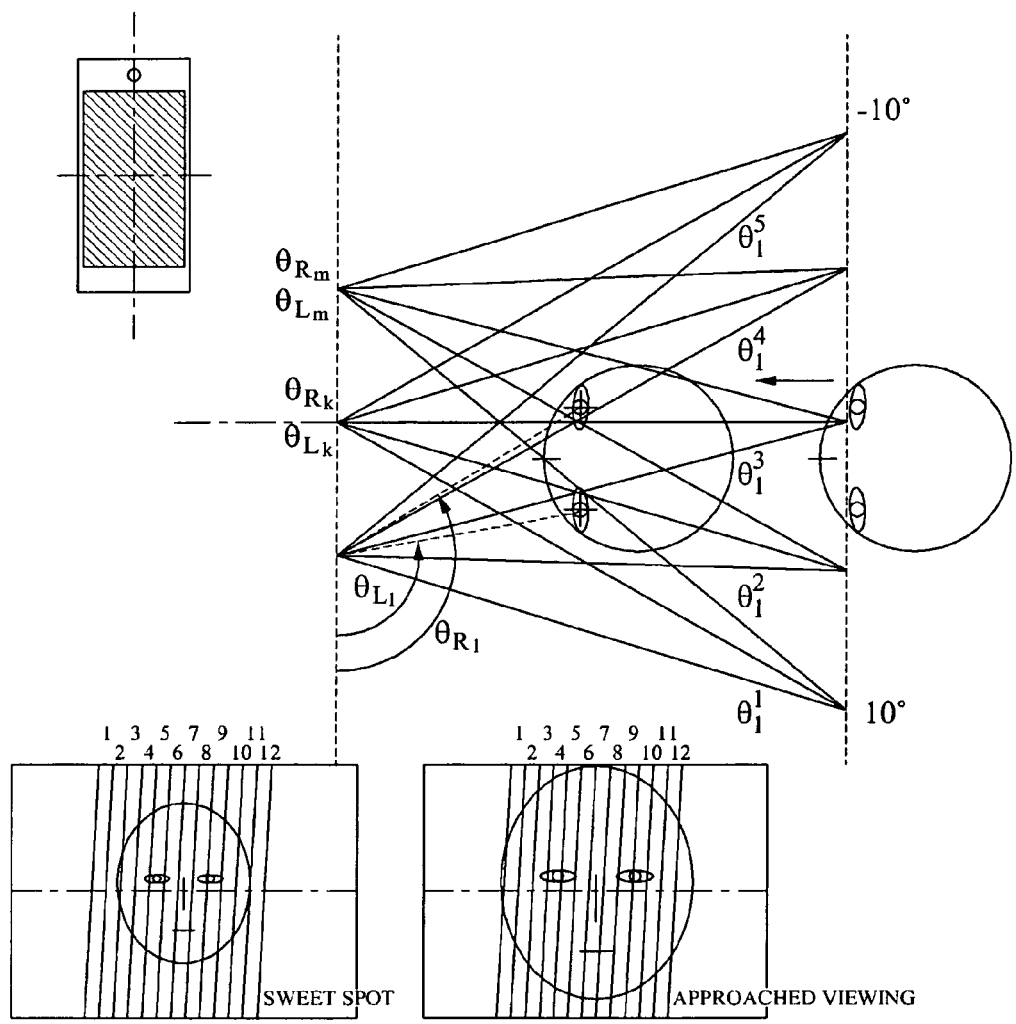
FIG. 9 illustrates an applying of an active sub-pixel rendering based on changes in a position and/or a posture of a user, according to one or more embodiments.

FIG. 9 illustrates an applying of an active sub-pixel rendering based on changes in a position and/or a posture of a user, according to one or more embodiments. That is, in FIG. 9, an active sub-pixel rendering scheme in a case where a user is located outside of the optimal viewing position will be described, e.g., with the user being located at an approached viewing position. First, a 3D spatial position of user's left and/or right eyes may be measured using a camera, for example, noting that additional and/or alternative measuring devices and techniques may be applied. As only an example, to measure the 3D spatial position, a scheme of measuring a distance ratio between the left and right eyes, a triangulation scheme using a stereo camera, a scheme of directly measuring a distance and direction using a depth camera, and the like, may be used.

Next, using the measured spatial position of the left and right eyes, for example, an angle formed between each 3D pixel and the left and right eyes may be calculated. For example, angles formed between a first 3D pixel and the left and right eyes may respectively be '$\theta_{R_1}$' and '$\theta_{L_1}$', angles formed between a k-th 3D pixel and the left/right eyes may respectively be '$\theta_{R_k}$' and '$\theta_{L_k}$', and angles formed between an m-th 3D pixel and the left and right eyes may similarly be measured/calculated. Angles in which the left and right eyes are respectively spatially positioned relative to each 3D pixel may thus be calculated, and then a viewpoint image from each 3D pixel to be viewed by the respective left and right eyes may be calculated. When viewpoint information about the viewpoint image to be viewed in the above described manner is obtained, a corresponding viewpoint image based on the calculated angles and converted adjacent viewpoint images may thereby be displayed. As only an example, through pixel-rendering and/or sub-pixel rendering, the appropriate image may still be provided to a user by considering viewpoint information about the viewpoint image to be viewed and viewpoint images to be converted even if the user's head is tilted or the user is partially outside a viewing area or viewing angle.

In FIG. 9, for convenience of description, only angles measured with respect to a single plane have been described, however, a spatial angle may also be practically measured/calculated to calculate an image viewed by the left and right eyes.

Figure 10:
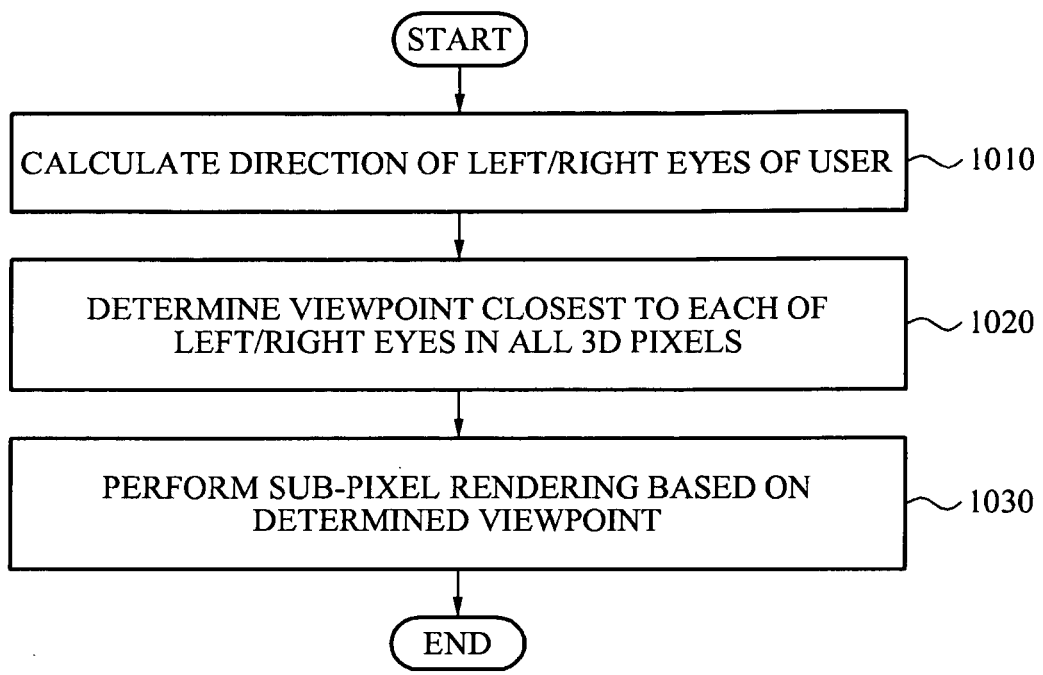
FIG. 10 is a flowchart illustrating an active sub-pixel rendering method based on changes in a position and/or a posture of a user, according to one or more embodiments.

FIG. 10 is a flowchart illustrating an active sub-pixel rendering method based on changes in a position and/or a posture of a user, according to one or more embodiments. The active sub-pixel rendering method may be performed by an image display system, for example.

In operation 1010, a viewing direction, relative to available 3D pixels, of a user's left and right eyes may be calculated. In this instance, the direction of user's left and right eyes may be expressed as '($\theta_{R_k}$, $\theta_{L_k}$)'. Here, '$\theta_{R_k}$' may designate an angle corresponding to a right eye relative to a k-th 3D pixel, and '$\theta_{L_k}$' may designate an angle corresponding to a left eye relative to the k-th 3D pixel. Though the k-th 3D pixel is referenced here, respective angles corresponding to the left and right eyes may be determined for each 3D pixel.

In operation 1020, a viewpoint closest to the viewing angle of left and right eyes in each of all 3D pixels may be determined. In this case, again using the k-th 3D pixel as an example, the viewpoint closest to the left and right eyes may be calculated based on the below Equation 2, for example.

$$F_{R_k} = \arg\left(\min_i |\theta_{R_k} - \theta_k^i|\right)$$

$$F_{L_k} = \arg\left(\min_i |\theta_{L_k} - \theta_k^i|\right)$$

Equation 2

Here, '$F_{R_k}$' denotes an optimal viewpoint intended to be viewed by the right eye from the k-th 3D pixel, '$F_{L_k}$' denotes an optimal viewpoint intended to be viewed by the left eye from the k-th 3D pixel, and '$\theta_k^i$' denotes an angle expressing an i-th viewpoint in the k-th 3D pixel. Here, for example, FIG. 9 illustrates example angles of different viewpoints from the first 3D pixel, represented as $\theta_1^1$, $\theta_1^2$, $\theta_1^3$, $\theta_1^4$, $\theta_1^5$, with ±10° variance.

In operation 1030, a sub-pixel rendering may then be performed based on the determined viewpoint. A method of performing the sub-pixel rendering based on the determined viewpoint has been described above and thus, further detailed descriptions thereof will be omitted.

Figure 11:
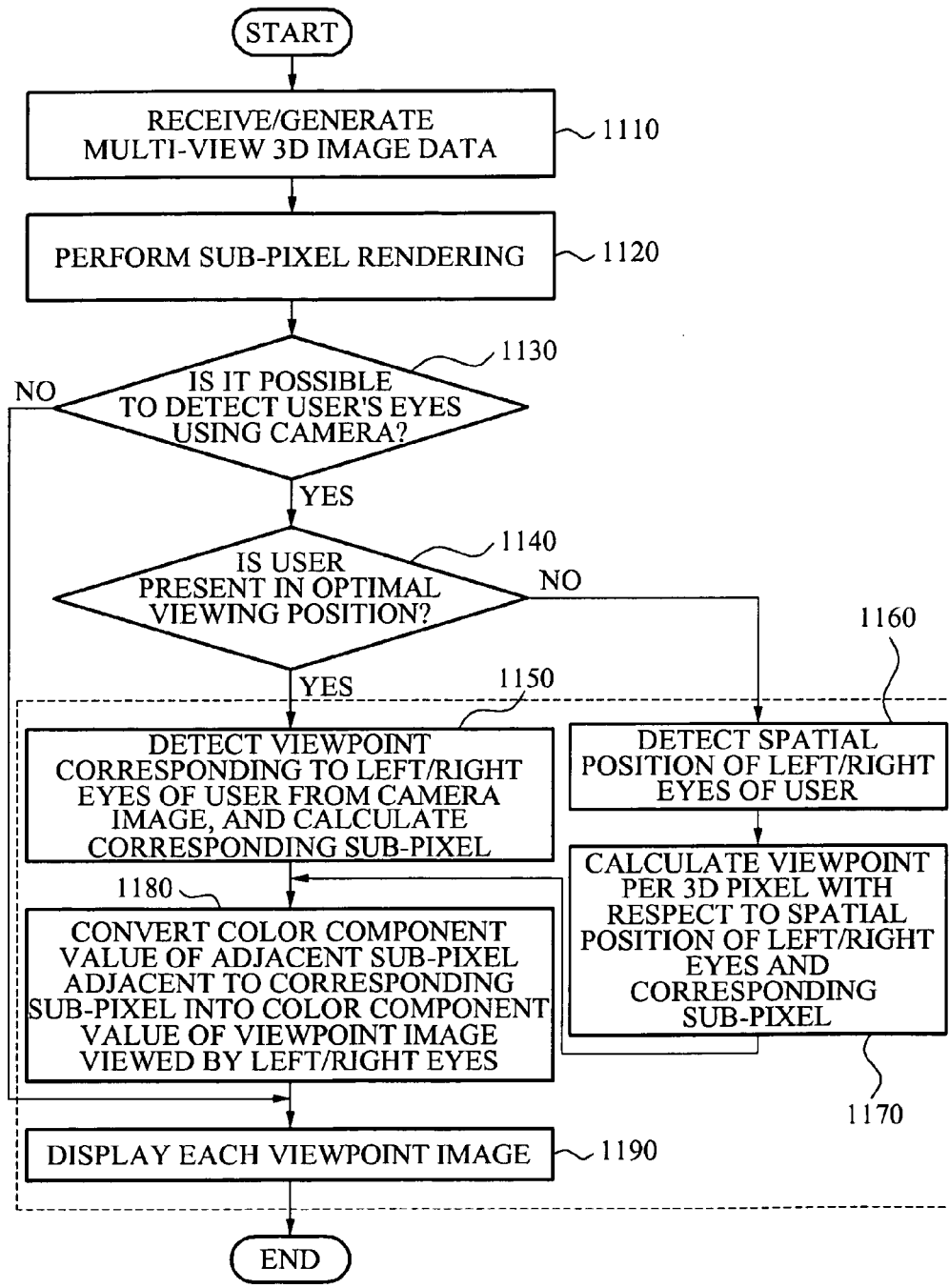
FIG. 11 is a flowchart illustrating an active sub-pixel rendering method, according to one or more embodiments.

FIG. 11 is a flowchart illustrating an active sub-pixel rendering method, according to one or more embodiments.

In operation 1110, multi-view 3D image data may be received and/or generated.

In operation 1120, a sub-pixel rendering may be performed.

In operation 1130, a verification may be performed as to whether detection of a user's eyes is possible using a camera, for example. When the detection of user's eyes is possible using the camera, operation 1140 may be performed, and otherwise, operation 1190 may be performed. That is, even when the detection of the user's eyes is impossible, multi-view viewing may be possible.

In operation 1140, there may be a verification as to whether the user is positioned in an optimal viewing position. When the user is positioned in the optimal viewing position, operation 1150 may be performed, and otherwise, operation 1160 may be performed.

In operation 1150, a viewpoint corresponding to the user's left and/or right eyes may be determined based on the obtained camera image, and the appropriate sub-pixels may be calculated for different viewpoints to be rendered. In this instance, for example, operation 1150 may be performed, and then operation 1180 performed.

In operation 1160, a spatial position of the user's left and right eyes may be detected using the camera.

In operation 1170, a viewpoint and corresponding sub-pixel for each 3D pixel may be calculated with respect to the spatial position of the user's left and right eyes.

In operation 1180, a color component value of a sub-pixel adjacent to a corresponding sub-pixel for the calculated viewpoint may be converted into a color component value of a viewpoint image corresponding to the calculated viewpoint, e.g., such that different color components from the same viewpoint image are displayed by the adjacent sub-pixels to be viewed by one of the left and right eyes, while other sub-pixels of the 3D pixel display singular color information for their respective different viewpoint images, as only an example.

In operation 1190, respective viewpoint images may be displayed.

Through operations 1150, 1160, and 1170, in one or more embodiments, a high quality multi-view 3D image may be provided to a user without demonstrating a deterioration in an image quality such as a color ghost and the like, regardless of the posture and position of the user.

Figure 12:
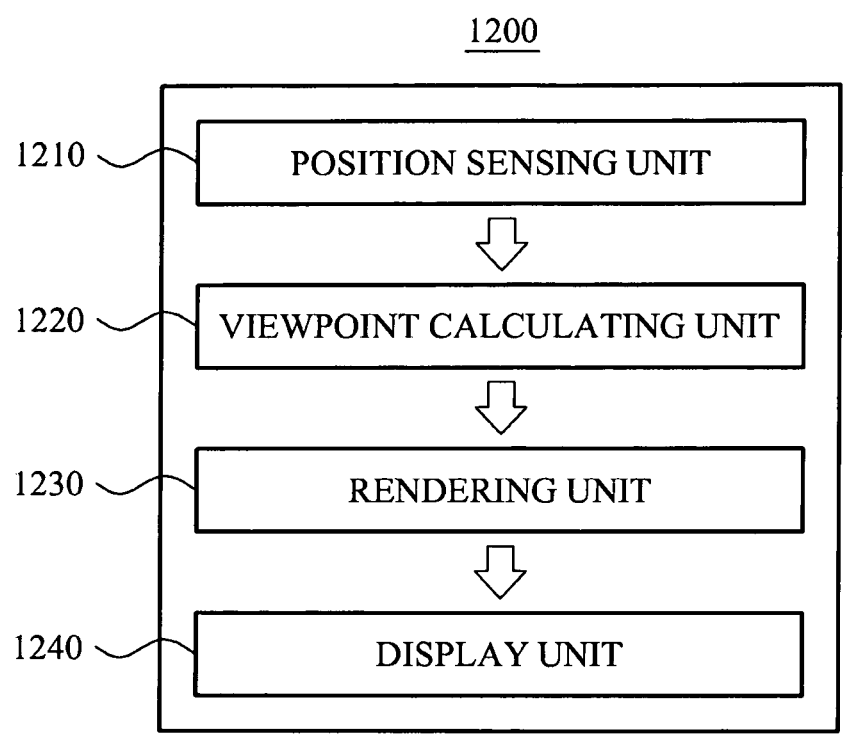
FIG. 12 is a block diagram illustrating an image display system, according to one or more embodiments.

FIG. 12 is a block diagram illustrating an image display system 1200, according to one or more embodiments.

The image display system 1200 may include a position sensing unit 1210, a viewpoint calculating unit 1220, a rendering unit 1230, and a display unit 1240, for example.

The position sensing unit 1210 may sense a position of left and right eyes of a user. For example, the position sensing unit 1210 may include a user image generation unit to generate a user image by photographing the user, for example, and a position calculating unit to calculate the position of the left/right eyes from the generated user image. As an example of determining a spatial position with respect to the left and right eyes, the user image generation unit may include at least one of a monocular camera, a stereo camera, a multi-camera, and a depth camera, again noting that alternative devices and/or techniques are equally available for determining the spatial position of a user and/or the user's left and/or right eyes. As another example, to determine the above described spatial position, the position sensing unit 1210 may further include a distance measuring unit to measure distance with the user by projecting a supplementary light source onto the user, to generate distance information. As the above, to sense the position of the left and right eyes, the user may be photographed to generate the user image, however again, the method of sensing the position of the left and/or right eyes may not be limited to an image processing method using a camera and the like.

The viewpoint calculating unit 1220 may calculate a viewpoint corresponding to the sensed position for one or more 3D pixels. In this instance, the viewpoint calculating unit 1220 may calculate a direction angle corresponding to the sensed position from at least one 3D pixel, and may compare differences between direction angles of all viewpoint images generated in the at least one 3D pixel with the calculated direction angle to thereby determine, as the calculated viewpoint corresponding to the sensed position, a viewpoint having a minimal difference.

The rendering unit 1230 may generate, as a sub-pixel unit, a viewpoint image of the calculated viewpoint. In this instance, the rendering unit 1230 may convert a color component value of a sub-pixel corresponding to an adjacent viewpoint adjacent to the calculated viewpoint into a color component value corresponding to the viewpoint image of the calculated viewpoint to thereby generate the viewpoint image of the calculated viewpoint and an additional viewpoint image(s) for the adjacent viewpoint(s), so that the viewpoint image of the calculated viewpoint and the additional viewpoint image(s) of the adjacent viewpoint(s) have different color components but represent the same image of the determined viewpoint.

The display unit 1240 may display the generated viewpoint image. The display unit 1240 may correspond to the above described display. In this instance, as an example, the display unit 1240 may display viewpoint images of at least two viewpoints being different from each other using one of a lenticular lens, a parallax barrier, prism arrangement, a holographic device having characteristics to convert a direction of light, and a directional backlight, as only examples. As another example, the display unit 1240 may include a lens being configured such that an optical axis is inclined at an angle obtained based on a ratio of a size of N pixels in a vertical direction to a size of M sub-pixels in a horizontal direction, with respect to a single 3D pixel. In this instance, N and M may be integers being mutually prime to each other. Also, M may be a multiple of 3. These examples may be used to enable the display unit 1240 to satisfy the above described conditions (1) to (3) for the purpose of the high-quality active sub-pixel rendering. For example, M being the multiple of 3 may be used to enable adjacent sub-pixels to have different color information.

Figure 13:
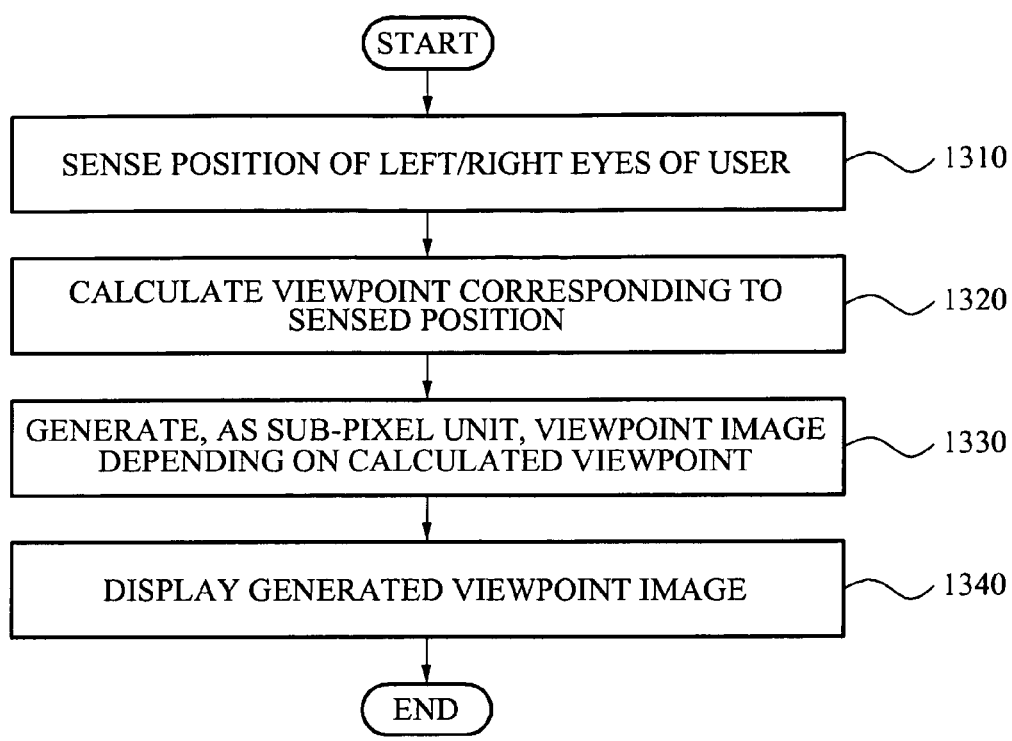
FIG. 13 is a flowchart illustrating an image display method, according to one or more embodiments.

FIG. 13 is a flowchart illustrating an image display method, according to one or more embodiments. In one or more embodiments, the image display method may be performed by the image display system 1200 of FIG. 12, for example.

In operation 1310, a position of a user and/or left and/or right eyes of the user may be sensed. For example, the user may be photographed to generate a user image, and the position of the left and/or right eyes may be calculated from the generated user image. As only an example of determining a spatial position with respect to the left and right eyes the spatial position may be determined by use of at least one of a monocular camera, a stereo camera, a multi-camera, and a depth camera. As another example, to determine the spatial position, distance information of the user may be measured by projecting a supplementary light source onto the user. In the above described examples, to sense information about the left and/or right eyes, the user may be photographed to generate the user image, however, a method of sensing the position of the left and/or right eyes is not limited to an image processing method using a camera and the like.

In operation 1320, a viewpoint corresponding to the sensed position may be calculated. In this instance, a direction angle corresponding to the sensed position from at least one 3D pixel may be calculated, and differences between direction angles of all viewpoint images generated in the at least one 3D pixel may be compared with the calculated direction angle to thereby determine, as the calculated viewpoint corresponding to the sensed position, a viewpoint having a minimal difference.

In operation 1330, for each sub-pixel unit, a viewpoint image of the calculated viewpoint may be generated/determined. In this instance, a color component value of a sub-pixel corresponding to an adjacent viewpoint adjacent to the calculated viewpoint may be converted into a color component value corresponding to the viewpoint image of the calculated viewpoint to thereby generate the viewpoint image of the calculated viewpoint and additional viewpoint image(s) of the adjacent viewpoint(s), respectively, so that the viewpoint image of the calculated viewpoint and the additional viewpoint image(s) of the adjacent viewpoint(s) have different color components but represent the same image of the determined viewpoint.

In operation 1340, the generated viewpoint image may be displayed. In this instance, as an example, viewpoint images of at least two viewpoints, e.g., for left and right eye viewpoints, being different from each other may be displayed using one of a lenticular lens, a parallax barrier, prism arrangement, a holographic device having characteristics to convert a direction of light, and a directional backlight, for example. As another example, images of at least two viewpoints being different from each other may be displayed using a lens being configured such that an optical axis is inclined at an angle obtained based on a ratio of a size of N pixels in a vertical direction to a size of M sub-pixels in a horizontal direction, with respect to a single 3D pixel. In this instance, N and M may be integers being mutually prime to each other. Also, M may be a multiple of 3. According to one or more embodiments, these examples may be used to enable a display according to a satisfaction of the above described conditions (1) to (3) for the purpose of the high-quality active sub-pixel rendering.

Figure 14:
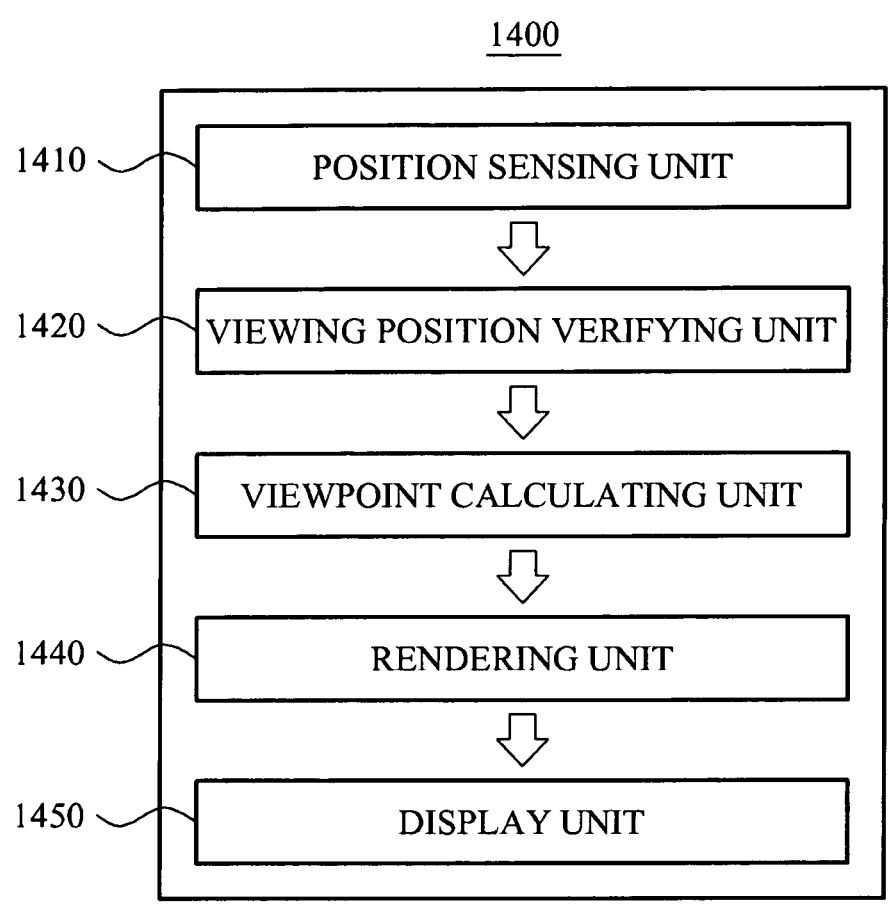
FIG. 14 is a block diagram illustrating an image display system, according to one or more embodiments.

FIG. 14 is a block diagram illustrating an image display system 1400, according to one or more embodiments. The image display system 1400 may include a position sensing unit 1410, a viewing position verifying unit 1420, a viewpoint calculating unit 1430, a rendering unit 1440, and a display unit 1450, for example.

The position sensing unit 1410 may sense a spatial position of left and/or right eyes of a user. In this instance, as an example of determining the spatial position with respect to the left and/or right eyes, the position sensing unit 1410 may include at least one of a monocular camera, a stereo camera, a multi-camera, and a depth camera, for example. As another example, to determine the spatial position, the position sensing unit 1410 may measure distance information with the user by projecting a supplementary light source onto the user.

The viewing position verifying unit 1420 may verify whether the user is present in an optimal viewing position based on the sensed spatial position. The optimal viewing position may be determined in advance based on a pixel structure or lens alignment of the display unit 1450, or the viewing position verifying unit 1420 may verify whether the user is present in the optimal viewing position in accordance with the sensed spatial position.

The viewpoint calculating unit 1430 may calculate a viewpoint corresponding to the sensed spatial position of respective 3D pixels when the user is not present in the optimal viewing position. In this instance, the viewpoint calculating unit 1230 may calculate a direction angle corresponding to the sensed spatial position from the respective 3D pixels, and compare differences between direction angles of all viewpoint images generated in the respective 3D pixels with the calculated direction angle to thereby determine, as the viewpoint corresponding to the sensed spatial position with respect to the respective 3D pixels, a viewpoint having a minimal difference. Also, when the user is present in the optimal viewing position, the viewpoint calculating unit 1430 may calculate a direction angle corresponding to the sensed position from at least one 3D pixel, and may compare differences between direction angles of all viewpoint images generated in the at least one 3D pixel with the calculated direction angle to thereby determine, as the viewpoint corresponding to the sensed position, a viewpoint having a minimal difference.

The rendering unit 1440 may generate, as a sub-pixel unit, a viewpoint image of the calculated viewpoint. In this instance, the rendering unit 1440 may convert a color component value of a sub-pixel corresponding to an adjacent viewpoint adjacent to the calculated viewpoint into a color component value corresponding to the viewpoint image of the calculated viewpoint to thereby generate the viewpoint image of the calculated viewpoint and an additional viewpoint image(s) of the adjacent viewpoint(s), respectively, so that the viewpoint image of the calculated viewpoint and the additional viewpoint image(s) of the adjacent viewpoint(s) have different color components but represent the same image of the determined viewpoint.

The display unit 1450 may display the generated viewpoint image. In this instance, as an example, the display unit 1450 may display viewpoint images of at least two viewpoints being different from each other using one of a lenticular lens, a parallax barrier, prism arrangement, a holographic device having characteristics to convert a direction of light, and a directional backlight, for example. As another example, the display unit 1450 may include a lens being configured such that an optical axis is inclined at an angle obtained based on a ratio of a size of N pixels in a vertical direction to a size of M sub-pixels in a horizontal direction, with respect to a single 3D pixel. In this instance, N and M may be integers being mutually prime to each other. Also, M may be a multiple of 3. In one or more embodiment, these examples may be used to enable the display unit 1450 to satisfy the above described conditions (1) to (3) for the purpose of the high-quality active sub-pixel rendering. For example, M being the multiple of 3 may be used to enable adjacent sub-pixels to have different color information.

FIG. 15 is a flowchart illustrating an image display method, according to one or more embodiments.

In operation 1510, a spatial position of a user and/or left and/or right eyes of the user may be sensed. In this instance, as an example of determining the spatial position with respect to the left and/or right eyes, the spatial position may be sensed by using at least one of a monocular camera, a stereo camera, a multi-camera, and a depth camera, for example. As another example, to determine the spatial position, distance information for the user may be measured by projecting a supplementary light source onto the user.

In operation 1520, there may be a verification as to whether the user is present in an optimal viewing position based on the sensed spatial position. The optimal viewing position may be determined in advance based on a pixel structure or lens alignment of a display, and there may be a verification of whether the user is present in the optimal viewing position in accordance with the sensed spatial position.

In operation 1530, a viewpoint corresponding to the sensed spatial position of respective 3D pixels may be calculated when the user is not present in the optimal viewing position. In this instance, a direction angle corresponding to the sensed spatial position from the respective 3D pixels may be calculated, and differences between direction angles of all viewpoint images generated in the respective 3D pixels compared with the calculated direction angle to thereby determine, as the viewpoint corresponding to the sensed spatial position with respect to the respective 3D pixels, a viewpoint having a minimal difference. Also, when the user is positioned in the optimal viewing position, a direction angle corresponding to the sensed position from at least one 3D pixel may be calculated, and differences between direction angles of all viewpoint images generated in the at least one 3D pixel may be compared with the calculated direction angle to thereby determine, as the calculated viewpoint corresponding to the sensed position, a viewpoint having a minimal difference.

In operation 1540, for a sub-pixel unit, a viewpoint image of the calculated viewpoint may be generated. In this instance, a color component value of a sub-pixel corresponding to an adjacent viewpoint adjacent to the calculated viewpoint may be converted into a color component value corresponding to the viewpoint image of the calculated viewpoint to thereby generate the viewpoint image of the calculated viewpoint and additional viewpoint image(s) of the adjacent viewpoint, respectively, so that the viewpoint image of the calculated viewpoint and the additional viewpoint image(s) of the adjacent viewpoint have different color components but represent the same viewpoint image of the determined viewpoint.

In operation 1550, the generated viewpoint image may be displayed. In this instance, as an example, viewpoint images of at least two viewpoints being different from each other may be displayed using one of a lenticular lens, a parallax barrier, prism arrangement, a holographic device having characteristics to convert a direction of light, and a directional backlight, for example. As another example viewpoint images of at least two viewpoints being different from each other may be displayed using a lens being configured such that an optical axis is inclined at an angle obtained based on a ratio of a size of N pixels in a vertical direction to a size of M sub-pixels in a horizontal direction, with respect to a single 3D pixel. In this instance, N and M may be integers being mutually prime to each other. Also, M may be a multiple of 3. These examples may be used to satisfy the above described conditions (1) to (3) for the purpose of the high-quality active sub-pixel rendering. For example, M being the multiple of 3 may be used to enable adjacent sub-pixels to have different color information.

As described above, using the image display system or the image display method, according to one or more embodiments, a low resolution disadvantage of existing autostereoscopic multi-view displays may be overcome through an active sub-pixel rendering, whereby an increased number of viewpoint images may be displayed using an existing panel even without needing to increase a resolution of a display panel, or without needing to use a high-speed panel used for time-division 3D expression, and a high quality 3D image may be implemented through tracking of a user using a camera, for example, without using a high-priced, high-speed, and high-resolution display panel.

In addition, even when the user is located outside of the optimal viewing position, or when the user is in a tilted posture relative to a display, viewpoint rendering may be performed to match the user's position or posture, thereby expressing a high quality 3D image, and preventing occurrence of crosstalk of adjacent viewpoint images generated based on a user's viewing position to thereby express the 3D image without eye fatigue.

In one or more embodiments, apparatus, system, and unit descriptions herein include one or more hardware processing elements. For example, outside of the described pixel or sub-pixel unit representing a display unit making up only a portion of a display or to-be displayed entire pixel, each described unit may include one or more processing machines, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image display system, the system comprising:
a position sensing unit to sense a position of user or one or more eyes of the user;
a viewpoint calculating unit to calculate a viewpoint corresponding to the sensed position;
a rendering unit to set a sub-pixel, of a three-dimensional (3D) pixel having plural sub-pixels, to have color information from a viewpoint image of the sub-pixel, with a viewpoint of the sub-pixel and the viewpoint image of the sub-pixel being determined to be corresponding to the calculated viewpoint, and to set at least one other sub-pixel of the 3D pixel having a different viewpoint from the viewpoint of the sub-pixel to have additional color information of the viewpoint image of the sub-pixel; and
a display unit to display the color information of the sub-pixel and the additional color information of the at least one other sub-pixel.

2. The image display system of claim 1, wherein the rendering unit converts a color component value of the at least one other sub-pixel into a color component value corresponding to the viewpoint image of the sub-pixel, so that a color component of the color information of the viewpoint image of the sub-pixel is different from a color component of the additional color information of the viewpoint image of the sub-pixel.

3. The image display system of claim 2, wherein the display unit displays from the 3D pixel the color information by the sub-pixel and the additional color information by the at least one other sub-pixel using one of a lenticular lens, a parallax barrier, prism arrangement, a holographic device having characteristics to convert a direction of light, and a directional backlight.

4. The image display system of claim 1, wherein the display unit displays, from the 3D pixel, viewpoint images of at least two viewpoints being different from each other using one of a lenticular lens, a parallax barrier, prism arrangement, a holographic device having characteristics to convert a direction of light, and a directional backlight.

5. The image display system of claim 1, wherein the display unit displays the 3D pixel being configured such that an optical axis through a first sub-pixel of the 3D pixel and a first sub-pixel of another 3D pixel, for a same viewpoint, is inclined at an angle obtained based on a ratio of a size of N pixels in a vertical direction of the 3D pixel to a size of M sub-pixels in a horizontal direction of the 3D pixel, where N and M are integers being mutually prime to each other.

6. The image display system of claim 5, wherein M is a multiple of 3.

7. The image display system of claim 1, wherein the viewpoint calculating unit calculates a direction angle corresponding to the sensed position from at least one 3D pixel, and compares differences between each of direction angles of all viewpoint images available to the at least one 3D pixel and the calculated direction angle to thereby determine, as the calculated viewpoint, a viewpoint of a viewpoint image having a minimal difference.

8. The image display system of claim 1, wherein the position sensing unit comprises:
a user image generation unit to generate a user image by photographing the user; and
a position calculating unit to calculate positions of left and right eyes of the user from the generated user image.

9. The image display system of claim 8, wherein the user image generation unit includes at least one of a monocular camera, a stereo camera, a multi-camera, and a depth camera.

10. The image display system of claim 8, wherein the position sensing unit further includes:
a distance measuring unit to measure a distance between the display system and the user by projecting a supplementary light source onto the user, to generate distance information.

11. The image display system of claim 1, further comprising:
a viewing position verifying unit to determine whether the user is present in an optimal viewing position for three-dimensional (3D) image display based on the sensed position.

12. The image display system of claim 11, wherein, when a determination by the viewing position verifying unit indicates that the user is present in the optimal viewing position, the viewpoint calculating unit calculates a direction angle corresponding to the sensed position from at least one of the respective 3D pixels, and compares differences between each of direction angles for all viewpoint images from the at least one 3D pixel and the calculated direction angle to thereby determine, as the calculated viewpoint, a viewpoint of a viewpoint image having a minimal difference.

13. An image display method, the method comprising:
sensing a position of a user or one or more eyes of the user;
calculating, using one or more processing devices, a viewpoint corresponding to the sensed position;
rendering color information for sub-pixels of a three-dimensional (3D) pixel, including setting a sub-pixel of the 3D pixel to have color information from a viewpoint image of the sub-pixel, with a viewpoint of the sub-pixel and the viewpoint image of the sub-pixel being determined to be corresponding to the calculated viewpoint, and setting at least one other sub-pixel of the 3D pixel having a different viewpoint from the viewpoint of the sub-pixel to have additional color information of the viewpoint image of the sub-pixel; and
displaying the color information of the sub-pixel and the additional color information of the at least one other sub-pixel.

14. The image display method of claim 13, wherein the rendering includes converting a color component value of the at least one other sub-pixel into a color component value corresponding to the viewpoint image of the sub-pixel, so that a color component of the color information of the viewpoint image of the sub-pixel is different from a color component of the additional color information of the viewpoint image of the sub-pixel.

15. The image display method of claim 14, wherein the displaying further comprises displaying from the 3D pixel the color information by the sub-pixel and the additional color information by the at least one other sub-pixel using one of a lenticular lens, a parallax barrier, prism arrangement, a holographic device having characteristics to convert a direction of light, and a directional backlight.

16. The image display method of claim 13, wherein the displaying displays from the 3D pixel, viewpoint images of at least two viewpoints being different from each other using one of a lenticular lens, a parallax barrier, prism arrangement, a holographic device having characteristics to convert a direction of light, and a directional backlight.

17. The image display method of claim of 13, wherein the calculating calculates a direction angle corresponding to the sensed position from at least one 3D pixel, and compares differences between direction angles of all viewpoint images available to the at least one 3D pixel with the calculated direction angle to thereby determine, as the calculated viewpoint, a viewpoint having a minimal difference.

18. The image display method of claim 13, wherein the sensing includes:
generating a user image by photographing the user; and
calculating the position of left and right eyes of the user from the generated user image.

19. The image display method of claim 13, further comprising:
determining whether the user is present in an optimal viewing position for three-dimensional (3D) image display based on the sensed position.

20. The image display method of claim 19, wherein, based upon the determining indicating that the user is present in the optimal viewing position, the calculating calculates a direction angle corresponding to the sensed position from at least one of the respective 3D pixels, and compares differences between direction angles for all viewpoint images from the at least one 3D pixel with the calculated direction angle to thereby determine, as the viewpoint corresponding to the sensed position, a viewpoint having a minimal difference.

21. A non-transitory computer-readable recording medium comprising computer readable code to control at least one processing device to implement the image display method of claim 13.

22. A 3D display system, the system comprising:
a viewpoint calculating unit to calculate a left viewpoint based on a determined variable orientation of the user relative to a display and to calculate a right viewpoint based on the determined orientation of the user relative to the display; and
a rendering unit to generate a left viewpoint image based on the left viewpoint, a right viewpoint image based on the right viewpoint, and at least one additional left viewpoint image from one or more sub-pixels from a viewpoint different from the left viewpoint and/or at least one additional right viewpoint image from sub-pixels from a viewpoint different from the right viewpoint though active sub-pixel rendering,
wherein a simultaneous display of the generated left viewpoint image, the generated right viewpoint image, and at least one of the generated additional right and left viewpoint images provides the user with a 3D image for a three-dimensional (3D) pixel including plural sub-pixels.

23. The 3D display system of claim 22, further comprising a display unit to simultaneously display the generated left viewpoint image, the generated right viewpoint image, and the at least one of the generated additional right and left viewpoint images.

24. The 3D display system of claim 22, wherein the at least one additional left viewpoint image is generated from one or more viewpoints adjacent to the left viewpoint and the at least one additional right viewpoint image is generated from one or more viewpoints adjacent to the right viewpoint.

25. A 3D display method, the method comprising:
calculating, using one or more processing devices, a left viewpoint based on a determined variable orientation of the user relative to a display and calculating a right viewpoint based on the determined orientation of the user relative to the display; and
generating a left viewpoint image based on the left viewpoint, a right viewpoint image based on the right viewpoint, and at least one additional left viewpoint image from one or more sub-pixels from a viewpoint different from the left viewpoint and/or at least one additional right viewpoint image from sub-pixels from a viewpoint different from the right viewpoint though active sub-pixel rendering,
wherein a simultaneous displaying of the generated left viewpoint image, the generated right viewpoint image, and at least one of the generated additional right and left viewpoint images provides the user with a 3D image for a three-dimensional (3D) pixel including plural sub-pixels.

26. The 3D display method of claim 25, further comprising simultaneously displaying the generated left viewpoint image, the generated right viewpoint image, and the at least one of the generated additional right and left viewpoint images.

27. The 3D display method of claim 25, wherein, in the generating of the additional right and left viewpoint images, the at least one additional left viewpoint image is generated from one or more viewpoints adjacent to the left viewpoint and the at least one additional right viewpoint image is generated from one or more viewpoints adjacent to the right viewpoint.

28. A non-transitory computer-readable recording medium comprising computer readable code to control at least one processing device to implement the image display method of claim 25.

29. An image display system, the system comprising:
a position sensing unit to sense a position of a user or one or more eyes of the user;
a viewpoint calculating unit to calculate a viewpoint for at least one three-dimensional (3D) pixel with respect to the sensed position; and
a rendering unit to render a 3D image by performing active sub-pixel rendering based upon the calculated viewpoint, with the active sub-pixel rendering including rendering color information for a first sub-pixel of the 3D pixel having a viewpoint, of plural viewpoints of the 3D pixel, closest to the calculated viewpoint to have color information of a viewpoint image defined for the first sub-pixel and rendering color information for at least one sub-pixel, of the 3D pixel, adjacent to the first sub-pixel to have color information of the viewpoint image for the first sub-pixel, with the at least one sub-pixel adjacent to the first sub-pixel having a viewpoint different from the viewpoint of the first sub-pixel.

30. The image display system of claim 29, wherein the rendering unit performs the active-sub-pixel rendering by further rendering at least one different sub-pixel of the 3D pixel, different from the first sub-pixel and the at least one sub-pixel adjacent to the first sub-pixel, based on a viewpoint image of the different sub-pixel, different from the viewpoint image for the first sub-pixel, along a viewpoint different from the respective viewpoints of the first sub-pixel and the at least one sub-pixel adjacent to the first sub-pixel.

31. The image display system of claim 30, wherein the 3D pixel is rendered so that the first sub-pixel and the at least one sub-pixel adjacent to the first sub-pixel have different color component information for a same viewpoint image, and the 3D pixel is rendered so that the at least one different sub-pixel have a color component information for the different viewpoint image of the different sub-pixel.

32. The image display system of claim 29, further comprising a display unit to simultaneously display the viewpoint image for the first sub-pixel and at least one other viewpoint image through sub-pixels of the 3D pixel other than the first sub-pixel and the at least one sub-pixel adjacent to the first sub-pixel,
wherein the display unit displays the 3D image based on using one of a lenticular lens, a parallax barrier, prism arrangement, a holographic device having characteristics to convert a direction of light, and a directional backlight, for providing different viewpoints for each sub-pixel of the 3D pixel.

33. An image display method, the method comprising:
sensing a position of a user or one or more eyes of the user;
calculating, using one or more processing devices, a viewpoint for at least one three-dimensional (3D) pixel with respect to the sensed position; and
rendering a 3D image by performing active sub-pixel rendering based upon the calculated viewpoint, with the active sub-pixel rendering including rendering color information for a first sub-pixel of the 3D pixel having a viewpoint, of plural viewpoints of the 3D pixel, closest to the calculated viewpoint to have color information of a viewpoint image defined for the first sub-pixel and rendering color information for at least one sub-pixel adjacent to the first sub-pixel to have color information of the viewpoint image for the first sub-pixel, with the at least one sub-pixel, of the 3D pixel, adjacent to the first sub-pixel having a viewpoint different from the viewpoint of the first sub-pixel.

34. The image display method of claim 33, further comprising rendering at least one different sub-pixel of the 3D pixel, different from the first sub-pixel and the at least one sub-pixel adjacent to the first sub-pixel, based on a viewpoint image of the different sub-pixel, different from the viewpoint image for the first sub-pixel, along a viewpoint different from the respective viewpoints of the first sub-pixel and the at least one sub-pixel adjacent to the first sub-pixel.

35. The image display method of claim 34, wherein the 3D pixel is rendered so that the first sub-pixel and the at least one sub-pixel adjacent to the first sub-pixel have different color component information for a same viewpoint image, and the 3D pixel is rendered so that the at least one different sub-pixel have a color component information for the different viewpoint image of the different sub-pixel.

36. The image display method of claim 33, further comprising simultaneously displaying the viewpoint image for the first sub-pixel and at least one other viewpoint image through sub-pixels of the 3D pixel other than the first sub-pixel and the at least one sub-pixel adjacent to the first sub-pixel,
wherein the simultaneously displaying includes displaying the 3D image based on using one of a lenticular lens, a parallax barrier, prism arrangement, a holographic device having characteristics to convert a direction of light, and a directional backlight, for providing different viewpoints for each sub-pixel of the 3D pixel.

37. A non-transitory computer-readable recording medium comprising computer readable code to control at least one processing device to implement the image display method of claim 33.

38. The image display system of claim 1, wherein the display unit displays the color information of the sub-pixel and the additional color information of the at least one other sub-pixel such that two different viewpoints are simultaneously displayed.

* * * * *